United States Patent
Ishikura et al.

(10) Patent No.: US 7,765,415 B2
(45) Date of Patent: Jul. 27, 2010

(54) SEMICONDUCTOR INTEGRATED CIRCUIT

(75) Inventors: Hiromichi Ishikura, Tokyo (JP);
Toyohiro Shimogawa, Tokyo (JP);
Katsumasa Uchiyama, Tokyo (JP);
Shoichiro Chiba, Tokyo (JP); Naoki Handa, Nanae (JP)

(73) Assignee: Renesas Technology Corp., Tokyo (JP)

( * ) Notice: Subject to any disclaimer, the term of this patent is extended or adjusted under 35 U.S.C. 154(b) by 552 days.

(21) Appl. No.: 11/879,498

(22) Filed: Jul. 18, 2007

(65) Prior Publication Data

US 2008/0034242 A1    Feb. 7, 2008

(30) Foreign Application Priority Data

Aug. 1, 2006   (JP) .............................. 2006-210313

(51) Int. Cl.
*G06F 1/00* (2006.01)
(52) U.S. Cl. .................... 713/310; 713/323; 713/330
(58) Field of Classification Search ................ 713/320, 713/310, 323, 330
See application file for complete search history.

(56) References Cited

U.S. PATENT DOCUMENTS

| | | | | |
|---|---|---|---|---|
| 6,092,207 | A * | 7/2000 | Kolinski et al. | 713/323 |
| 6,161,187 | A * | 12/2000 | Mason et al. | 713/322 |
| 6,308,278 | B1 * | 10/2001 | Khouli et al. | 713/323 |
| 7,383,138 | B2 * | 6/2008 | Ito et al. | 702/60 |
| 7,454,635 | B2 * | 11/2008 | Ito et al. | 713/322 |
| 2003/0043680 | A1 * | 3/2003 | Akiba et al. | 365/227 |
| 2006/0268625 | A1 * | 11/2006 | Imaizumi et al. | 365/189.01 |
| 2007/0162675 | A1 * | 7/2007 | Sugiura et al. | 710/260 |

FOREIGN PATENT DOCUMENTS

| | | | |
|---|---|---|---|
| JP | 9-69052 A | | 3/1997 |
| JP | 2000284974 | * | 10/2000 |
| JP | 2003-316486 A | | 11/2003 |

* cited by examiner

*Primary Examiner*—Chun Cao
(74) *Attorney, Agent, or Firm*—Miles & Stockbridge P.C.

(57) ABSTRACT

A semiconductor integrated circuit has an internal circuit to which operation power is supplied or interrupted, and a power supply control circuit for controlling the supply and interruption of operation power to the internal circuit in accordance with an operation mode. The power supply control circuit has a storage circuit and a power supply control sequence circuit. The storage circuit inputs and holds switching instruction data for instructing switching between supply and interruption of the operation power and low-power-consumption-mode data determining an operation mode of the interruption of operation power and cancellation of the interruption. The power supply control sequence circuit performs a control of transition between the interruption and supply of the operation power with reference to the switching instruction data and the low-power-consumption-mode data held in the storage circuit and, at the time of cancelling a state of interrupting the supply of operation power in response to the switching instruction data in the operation power supply interruption state according to the low-power-consumption-mode data, stops newly referring to the low-power-consumption mode data until an operation of the internal circuit to which the operation power is to be supplied is assured.

18 Claims, 15 Drawing Sheets

FIG. 2

| | TRANSITION CONDITION | CANCEL-LATION METHOD | CLOCK OSCILLATOR (OSCILLATOR PLL CPG) | ROM | CPU | RAM | PERIPHERAL MODULES | | | I/O PORTS |
|---|---|---|---|---|---|---|---|---|---|---|
| | | | | | | | WATCH DOG TIMER | 8-BIT TIMER | OTHERS | |
| CPU SLEEP MODE | CONTROL REGISTER (SBYCR) & SLEEP INSTRUCTION | INTERRUPT | OPERATING | STOP | STOP (HOLD) | OPERATING | OPERATING | OPERATING | STOP (HOLD) | OPERATING |
| ALL MODULE CLOCK STOP MODE | CONTROL REGISTER (SBYCR, MSTPCR) & SLEEP INSTRUCTION | INTERRUPT | OPERATING | STOP | STOP (HOLD) | STOP (HOLD) | OPERATING | OPERATING/STOP (HOLD) | STOP (HOLD) | HOLD |
| SOFTWARE STANDBY MODE | CONTROL REGISTER (SBYCR, DPSBYCR) & SLEEP INSTRUCTION | EXTERNAL INTERRUPT | STOP | STOP | STOP (HOLD) | STOP (HOLD) | STOP (HOLD) | STOP (HOLD) | STOP (HOLD) | HOLD |
| DEEP SOFTWARE STANDBY MODE | CONTROL REGISTER (SBYCR, DPSBYCR) & SLEEP INSTRUCTION | TERMINAL INPUT | STOP | STOP | STOP | STOP (HOLD/INDETE-RMINATE) | STOP | STOP | STOP | HOLD |
| HARDWARE STANDBY MODE | TERMINAL INPUT | | STOP | STOP | STOP | STOP (INDETE-RMINATE) | STOP | STOP | STOP | HiZ |

FIG. 3

| | | 11 | 12 | 13 |
|---|---|---|---|---|
| | | ROM | LOG | RAM |
| NORMAL STATE (ACTIVE STATE) | RESET STATE/CPU PROGRAM EXECUTION STATE | ON [VDD] | ON [VDD] | ON [VDD] |
| | CPU SLEEP MODE | | | |
| | ALL MODULE CLOCK STOP MODE | | | |
| INACTIVE STATE | SOFTWARE STANDBY MODE | OFF [GND] | ON [VDD] (HOLD) | ON [VDD] (HOLD) |
| | DEEP SOFTWARE STANDBY MODE — RAM VALID | OFF [GND] | OFF [GND] (RESET) | ON [VDD] (HOLD) |
| | DEEP SOFTWARE STANDBY MODE — RAM INVALID | OFF [GND] | OFF [GND] (RESET) | OFF [GND] (INDETERMINATE) |
| | HARDTWARE STANDBY MODE | OFF [GND] | OFF [GND] (RESET) | OFF [GND] (INDETERMINATE) |

SEMICONDUCTOR INTEGRATED CIRCUIT

CROSS-REFERENCE TO RELATED APPLICATIONS

The disclosure of Japanese Patent Application No. 2006-210313 filed on Aug. 1, 2006 including the specification, drawings and abstract is incorporated herein by reference in its entirety.

BACKGROUND OF THE INVENTION

The present invention relates to a semiconductor integrated circuit having a low power consumption mode accompanying power supply/interruption control. More particularly, the invention relates to a technique effectively applied to a microcomputer having a plurality of power regions in each of which operation power can be supplied/interrupted.

Many microcomputers have the function of changing a program execution state to a low-power-consumption state for the purpose of reducing power consumption. The low-power-consumption states include a CPU sleep mode, an entire-module stop mode, a software standby mode, and a hardware standby mode. In each of the modes, the operation of an internal circuit is stopped by stopping supply of clocks to modules and stopping an oscillator, and a standby mode is set, thereby realizing reduction in power consumption.

On the other hand, in a process of manufacturing a semiconductor integrated circuit, as a circuit device is becoming finer, the operation power voltage is becoming lower as the withstand voltage of a transistor decreases. Accordingly, there is a tendency that the gate threshold voltage of a MOS transistor is also lowered. Since the lower operation voltage and lower threshold voltage are desirable for reduction in power consumption and increase in operation speed, a voltage obtained by decreasing an external power supply voltage tends to be used as an operation power. However, decrease in the threshold voltage causes increase in leak current such as a sub-threshold leak current of a MOS transistor, and standby current in the low-power-consumption state increases because power supply voltage is not interrupted.

Consequently, a circuit system of reducing the standby current by interrupting (stopping) supply of the operation power to a part or all of inner circuits at the time of transition to the low-power-consumption state can be employed. For example, in a predetermined low-power-consumption mode such as a software standby mode, the power supply of an internal ROM requiring no power supply is interrupted. In a predetermined low-power-consumption mode such as a deep standby mode, the operation power supply to all or part of internal logics such as a CPU in addition to the internal ROM is interrupted. Further, in the case where data in a RAM does not have to be held, the operation power of the RAM can be also interrupted.

A reset instruction and an interruption request for a microcomputer are factors of cancelling the low-power-consumption state. Since the cancellation factors are generated asynchronously with the microcomputer, when the operation is interrupted by a reset (initialization) instruction or an interruption request during transition to the low-power-consumption state, there is the possibility that the power supply interrupting sequence is interrupted and undesirable operation is performed. For example, in the case of interrupting the power supply by cutting off a clamp MOS transistor and discharging an output of the clamp MOS transistor to the ground in a power supply circuit for generating an operation voltage decreased by negative feedback control of the clamp MOS transistor, if an initialization instruction is given during the power supply interrupting sequence, the discharging is performed in a state where the cutoff of the clamp MOS transistor is incomplete, and a flow-through current is generated in the power supply circuit. Depending on a low-power-consumption state which is set, when the power supply interruption is cancelled in response to a reset instruction, there is the possibility that an unstable signal is supplied to a circuit and erroneous operation or data destruction occurs. For example, when an inconstant propagation preventing circuit is made inactive before the power supply interruption is cancelled, and the power supply interruption is cancelled, at that instance, an unstable signal is supplied to the circuit, and an erroneous operation or data destruction occurs.

Japanese Unexamined Patent Publication No. Hei 9(1997)-069052 relates to a technique of controlling reception of the asynchronous cancellation factors such as an interruption for cancelling the power supply interruption state. The publication describes that, in a device (such as a DMAC, CPU, or the like) having a plurality of low-power-consumption operation modes for reducing current consumption, an interruption is inhibited in a period of transition to the low-power-consumption mode and a predetermined period after shift to the low-power-consumption mode. After lapse of the period, an interruption is permitted. Japanese Unexamined Patent Publication No. 2003-316486 describes that a power consumption reduction circuit is provided with delay means by which cancellation of clamping of a reset signal to a power supply controllable circuit becomes the last at the time of restarting power supply.

SUMMARY OF THE INVENTION

In the technique of Japanese Unexamined Patent Publication No. Hei 9(1997)-069052 of stopping an interruption for a predetermined period, response to initialization by a reset deteriorates. Further, the technique does not solve an inconvenience and the like occurring when the power interruption is cancelled after the inconstant propagation preventing circuit is made inactive in association with the initializing operation responding to a reset instruction.

In the technique of Japanese Unexamined Patent Publication No. 2003-316486, propagation of a reset signal is just delayed by a simple delay circuit. When a delay amount is too small, data destruction or the like occurs. When a delay amount is too large, response of a reset deteriorates.

An object of the present invention is to provide a semiconductor integrated circuit having quick response to a low-power-consumption state cancellation request and capable of preventing an erroneous operation accompanying cancellation of a low-power-consumption state In other words, an object of the invention is to provide a semiconductor integrated circuit capable of guaranteeing that the circuit returns from a low-power-consumption state to a normal state in quick response to occurrence of a factor of cancelling the low-power-consumption state and can continue normal operation.

Another object of the invention is to enable a semiconductor integrated circuit to perform a stable operation by avoiding abnormal operation of a power supply at the time of external power-on or occurrence of instantaneous power interruption.

The above and other objects and novel features of the present invention will become apparent from the description of the specification and appended drawings.

The outline of representative ones of inventions disclosed in the specification will be briefly described as follows.

1. Cancellation of Low-Power-Consumption Mode by Reset

A semiconductor integrated circuit according to the present invention has an internal circuit to which operation power is supplied or interrupted, and a power supply control circuit for controlling the supply and interruption of operation power to the internal circuit in accordance with an operation mode. The power supply control circuit has a storage circuit and a power supply control sequence circuit. The storage circuit inputs and holds switching instruction data for instructing switching between supply and interruption of the operation power and low-power-consumption-mode data determining an operation mode of the interruption of operation power and cancellation of the interruption. The held switching instruction data and the low-power-consumption-mode data is initialized in response to a reset instruction from the outside. The switching instruction data and the low-power-consumption-mode data initialized instructs supply of operation power to the internal circuit. The power supply control sequence circuit performs a control of transition between the interruption and supply of the operation power with reference to the switching instruction data and the low-power-consumption-mode data held in the storage circuit and, at the time of cancelling a state of interrupting the supply of operation power in response to the switching instruction data in the operation power supply interruption state according to the low-power-consumption-mode data, stops newly referring to the low-power-consumption mode data until an operation of the internal circuit to which the operation power is to be supplied is assured.

With the above means, at the time of cancelling a state of interrupting the supply of operation power in response to the switching instruction data in the operation power supply interruption state, new reference to the low-power-consumption mode data is stopped until an operation of the internal circuit to which the operation power is to be supplied is assured. Consequently, the cancelling operation according to the low-power-consumption-mode data maintained just before the operation power supply interruption state is cancelled can be assured. Moreover, the cancelling operation can start without delay in response to the cancelling operation instruction according to the switching instruction data. For example, a case is considered in which when the internal circuit has a plurality of power supply regions, and a circuit for preventing inconstant propagation of a signal from a power supply region to which power is interrupted to a power supply region to which power is supplied is disposed, low-power-consumption-mode data employing a sequence of setting the inconstant propagation preventing circuit and interrupting power supply is set in the storage circuit, and the low-power-consumption state is obtained. At the time of responding to an instruction of cancelling the power supply interruption, the power supply control sequence circuit continuously refers to the low-power-consumption-mode data which has been set in advance, thereby assuring that the power interruption is cancelled and, after that, the inconstant propagation preventing circuit is made inactive. Therefore, a situation can be prevented such that an unstable signal propagates to a power supply region at a post stage to which power is supplied before the operation power to be supplied again to the power supply region to which power is interrupted becomes stable, and data held on the inside is destroyed. The normal operation of the internal circuit after restart of the power supply can be assured.

Competition Between Transition to Low-Power-Consumption Mode and Reset

As a concrete mode of the invention, when the control of transition to the operation power supply interruption state starts in accordance with the switching instruction data, the power supply control sequence circuit stops newly referring to the switching instruction data until the operation power supply interruption completes. Since new reference to the switching instruction data is stopped until the operation power supply interruption completes, even if the switching instruction data and the low-power-consumption-mode data in the storage circuit is changed due to a reset instruction or an interruption request during the transition to the power interruption state, the operation power supply interrupting operation is not interrupted, the power supply interrupting sequence is not disturbed, and an undesired operation caused by disturbance in the power supply interrupting sequence does not occur. For example, in the case of cutting off a clamp MOS transistor, discharging an output node of the clamp MOS transistor to the ground voltage, and interrupting power supply to a power supply circuit for generating an operation power decreased by negative feedback control of the clamp MOS transistor, if an initialization instruction is given during the power supply interrupting sequence, discharging is performed in a state where the cutoff of the clamp MOS transistor is incomplete, and a flow-through current occurs in the power supply circuit. In the present invention, such a state is avoided. When the power supply interrupting operation completes, the switching instruction data and the low-power-consumption-mode data in the storage circuit has been already changed in accordance with the reset instruction or the interrupt request. Consequently, after the power supply interruption, the circuit can immediately shift to the next operation mode.

Stop of Reference: Buffer Update Permission

As another concrete mode of the invention, the semiconductor integrated circuit further includes a switching instruction data buffer to which the switching instruction data held in the storage circuit is input and to which the power supply control sequence circuit refers. The power supply control sequence circuit waits for completion of the power supply interruption and, after the completion, permits the held data to be updated in the switching instruction data buffer.

As further another concrete mode of the invention, the semiconductor integrated circuit further includes a low-power-consumption mode data buffer to which the low-power-consumption mode data held in the storage circuit is input and to which the power supply control sequence circuit refers. The power supply control sequence circuit permits the held data to be updated in the low-power-consumption mode data buffer in a period in which the operation of an internal circuit to which the operation power is supplied is assured.

Storage Circuit; F/F and Mode Register

As further another concrete mode of the invention, the internal circuit has a central processing unit, and the storage circuit comprises a flip flop outputting the switching instruction data, and a low-power-consumption-mode register holding the low-power-consumption-mode data. The flip flop is set when the central processing unit executes a sleep instruction, is reset in response to an interruption, is reset in response to an external reset request, instructs power supply interruption in the set state, and instructs power supply in the reset state. An output of the flip flop is supplied as switching instruction data to the switching instruction data buffer. The low-power consumption-mode register is accessed for reading/writing by the CPU, and the low-power-consumption-mode data held in the low-power-consumption-mode register, is supplied to the low-power-consumption-mode data buffer.

Inconstant Propagation Prevention

As further another concrete mode of the invention, the internal circuit has a plurality of power supply regions in each of which operation power can be supplied or interrupted, and a signal propagation path from one power supply region to another power supply region is provided with an inconstant propagation preventing circuit for clamping an output to a signal propagation path extended to a power supply region on the downstream side to a predetermined logical value at the time of interruption of the operation power in a power supply region on the upstream side. The power supply control sequence circuit performs a transition control of clamping and cancellation of an output logical value by the inconstant propagation preventing circuit by referring to the switching instruction data and the low-power-consumption-mode data held in the storage circuit.

For example, the state where operation of the internal circuit to which the operation power is supplied as a condition of stopping newly referring to the low-power-consumption-mode data is a state where cancellation of clamping an output logical value of the inconstant propagation preventing circuit completes.

Clamp Power Supply

As further another concrete mode of the invention, the semiconductor integrated circuit further includes a power supply circuit for generating operation power to be supplied to the internal circuit on the basis of an external power supplied from the outside. The power supply circuit has a voltage regulator for each of the power regions. The voltage regulator includes a clamp circuit for clamping drain voltage to a voltage equal to reference voltage by performing negative feedback control on conductance of a clamp MOS transistor so that the drain voltage coincides with the reference voltage, a discharge MOS transistor for selectively conducting the drain of the clamp MOS transistor to ground potential, and a cut-off MOS transistor for selectively turning off the clamp MOS transistor. The power supply control sequence circuit generates a switching control timing of the clamp MOS transistor and the discharge MOS transistor in accordance with a plurality of signal logical operation results obtained by sequentially delaying the switching instruction data and, in response to a change that instructs operation power supply interruption of the switching instruction data, generates a switching control timing of turning off the clamp MOS transistor by the cutoff MOS transistor, turning on the discharge MOS transistor, and interrupting power. The power supply interruption state denotes, for example, as described above, a state where an output of the power supply-circuit is stopped by the cutoff MOS transistor and the discharge MOS transistor.

Clamping of State at Power-On

As a concrete mode of the invention, by the time operation power supplied from the outside of the semiconductor integrated circuit becomes stable, the power supply control sequence circuit reaches a predetermined program execution state or a predetermined low-power-consumption mode according to predetermined low-power-consumption-mode data. Since the inside of the power supply sequence control circuit does not become unstable at power on, if a reset instruction is given from the outside, a situation does not occur in which reference to the storage circuit necessary to cancel the interruption of power supply is continuously stopped. By power-on, the inside of the semiconductor integrated circuit can be reset to the normal state.

Countermeasure for Instantaneous, Interruption of Operation Power

As further another mode of the invention, the power supply control sequence circuit deactivates an input of the low-power-consumption-mode data from the internal circuit to the storage circuit until it reaches the predetermined program execution state. It helps to avoid a situation such that the internal circuit which becomes unstable due to instantaneous interruption of the operation power makes the low-power-consumption-mode data inconstant, so that the state of the power supply control sequence circuit cannot be unconditionally determined. Also in the case where a reset is not instructed at power-on and the internal circuit becomes unstable, the circuit can be stabilized in the program execution state or a power supply state according to a predetermined low-power-consumption mode via the power supply control sequence circuit.

To make the control performed more reliably, the power supply control sequence circuit deactivates an input of switching instruction data from the internal circuit and the outside of the semiconductor integrated circuit to the storage circuit until it reaches the predetermined program execution state or the low-power-consumption-power mode.

Erroneous Operation Prevention

As a concrete mode of the invention, the internal circuit has a central processing unit (CPU) capable of writing low-power-consumption-mode data to the storage circuit. The power supply control sequence circuit activates input of an operation power supply interruption instruction by the switching instruction data to the storage circuit in an active mode in which the central processing unit can access the storage circuit. The power supply-control sequence circuit activates input of an operation power supply interruption canceling instruction by the switching instruction data to the storage circuit in an inactive mode in which the central processing unit cannot access the storage circuit. Thus, the low-power-consumption mode can be prevented from being undesirably changed by unstable operation of the internal circuit.

To realize it more reliably, the power supply control sequence circuit deactivates a write enable signal to the storage circuit in the inactive mode.

2. Clamping of State at Power-On

A semiconductor integrated circuit according to another aspect of the invention has an internal circuit to which operation power is supplied or interrupted, and a power supply control circuit for controlling the supply and interruption of operation power to the internal circuit in accordance with an operation mode. The power supply control circuit has a storage circuit and a power supply control sequence circuit. The storage circuit inputs and holds control data for controlling switching between supply and interruption of the operation power. The held control data is initialized in response to a reset instruction from the outside. The initialized control data instructs supply of operation power to the internal circuit. The power supply control sequence circuit performs a control of transition between the interruption and supply of the operation power with reference to the control data held in the storage circuit. By the time an operation power is supplied from the outside of the semiconductor integrated circuit and the operation power becomes stable, the power supply control sequence circuit reaches a predetermined program execution state or a state in a predetermined low-power-consumption mode instructed by predetermined control data. Since the inside of the power, supply sequence control circuit does not become unstable at power on, if a reset instruction is given from the outside, a situation does not occur in which reference to the storage circuit necessary to cancel the interruption of power supply is continuously stopped. By power-on, the inside of the semiconductor integrated circuit can be reset to the normal state.

Countermeasure for Instantaneous Interruption of Operation Power

As a concrete mode of the invention, the power supply control sequence circuit deactivates input of the control data from the internal circuit to the storage circuit until the power supply control sequence circuit reaches the predetermined program execution state or a state in the low-power-consumption mode. It helps to avoid a situation such that the internal circuit which becomes unstable due to instantaneous interruption of the operation power makes the low-power-consumption-mode data inconstant, so that the state of the power supply control sequence circuit cannot be unconditionally determined. Also in the case where a reset is not instructed at power-on and the internal circuit becomes unstable, the circuit can be stabilized in the program execution state or a power supply state according to a predetermined low-power-consumption mode via the power supply control sequence circuit.

To make the control performed more reliably, the power supply control sequence circuit deactivates an input of switching instruction data from the internal circuit and the outside of the semiconductor integrated circuit to the storage circuit until it reaches the predetermined program execution state or the low-power-consumption-power mode.

3. Erroneous Operation Prevention

A semiconductor integrated circuit according to further another aspect of the invention has an internal circuit to which operation power is supplied or interrupted, and a power supply control circuit for controlling the supply and interruption of operation power to the internal circuit in accordance with an operation mode. The power supply control circuit has a storage circuit and a power supply control sequence circuit. The storage circuit inputs and holds switching instruction data instructing switching between supply and interruption of the operation power and low-power-consumption-mode data determining an operation mode of interruption/cancellation of operation power. The switching instruction data and the low-power-consumption-mode data held is initialized in response to a reset instruction from the outside. The switching instruction data and the low-power-consumption-mode data initialized instructs supply of operation power to the internal circuit. The power supply control sequence circuit performs a control of transition between the interruption and supply of the operation power with reference to the switching instruction data and the low-power-consumption-mode data held in the storage circuit. The internal circuit has a central processing unit capable of writing low-power-consumption-mode data to the storage circuit. The power supply control sequence circuit activates input of an operation power supply interruption instruction by the switching instruction data to the storage circuit in an active mode in which the central processing unit can access the storage circuit. The power supply control sequence circuit activates input of an operation power supply interruption canceling instruction by the switching instruction data to the storage circuit in an inactive mode in which the central processing unit cannot access the storage circuit. Thus, the low-power-consumption mode can be prevented from being undesirably changed by unstable operation of the internal circuit.

To realize it more reliably, the power supply control sequence circuit deactivates a write enable signal to the storage circuit in the inactive mode.

Effects obtained by representative ones of inventions disclosed in the specification will be briefly described as follows.

A response to a low-power-consumption state cancelling request is quick, and an erroneously operation accompanying cancellation of the low-power-consumption state can be prevented. In other words, the circuit can assure to immediately respond to occurrence of a factor of cancelling the low-power-consumption state, return to a normal state from the low-power-consumption state, and continue normal operation.

Further, abnormal operation of a power supply at power on from the outside or when instantaneous interruption occurs can be avoided, and the stable operation can be assured.

BRIEF DESCRIPTION OF DRAWINGS

FIG. 2 is a diagram showing modes as concrete examples of a low power consumption state.

FIG. 3 is a diagram showing modes each illustrating a state of supply/interruption of operation power to an internal circuit according to the internal state of the microcomputer.

DETAILED DESCRIPTION OF THE PREFERRED EMBODIMENTS

Microcomputer

Figure 1:
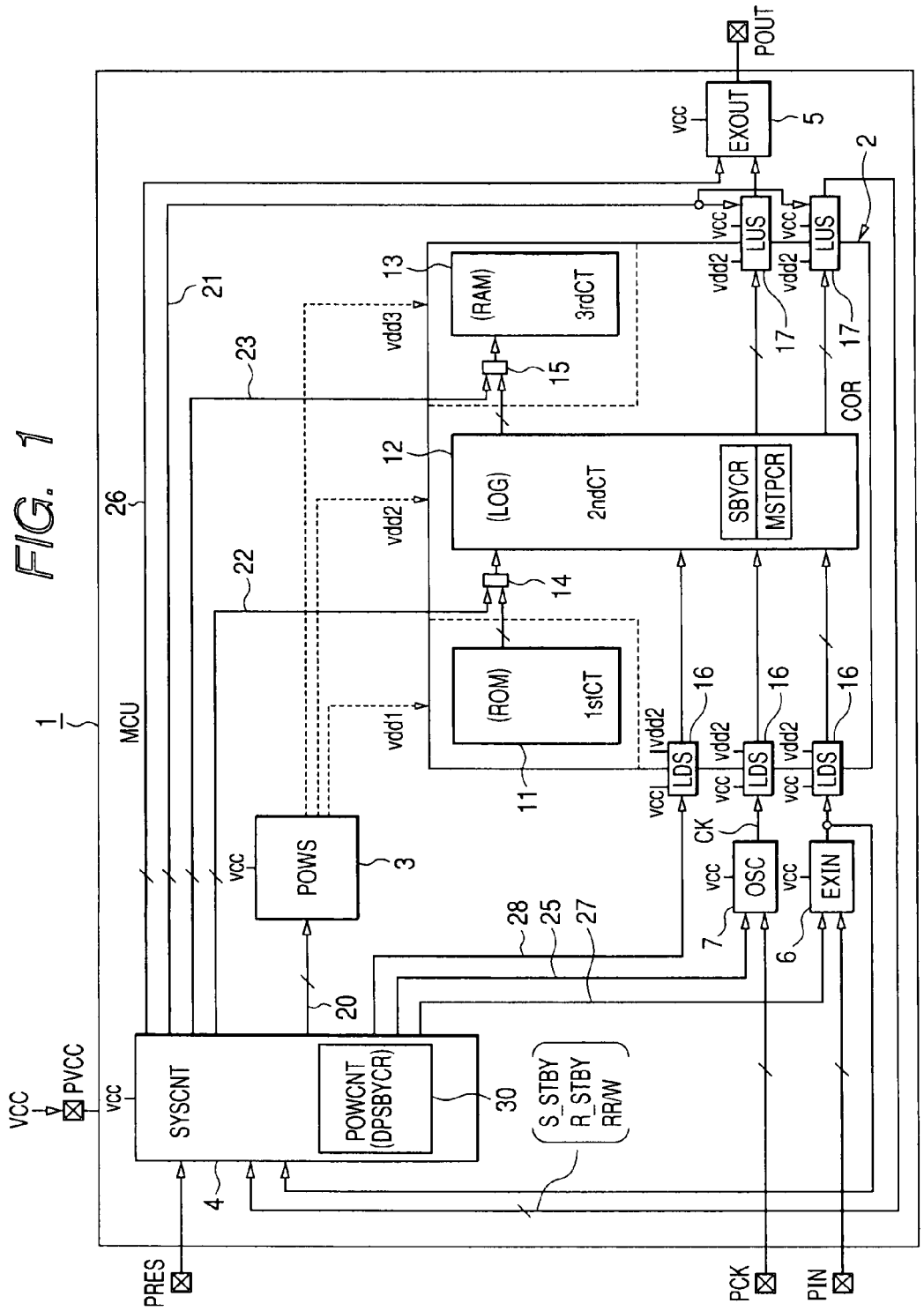
FIG. 1 is a block diagram showing a microcomputer as an example of a semiconductor integrated circuit according to the invention.

FIG. 1 shows a microcomputer as an example of a semiconductor integrated circuit according to the present invention. A microcomputer (MCU) 1 shown in the diagram is formed on a single semiconductor substrate of single crystal silicon or the like by, for example, a complementary MOS integrated circuit manufacturing technique. The microcomputer 1 has an internal circuit (COR) 2 whose operation power is controlled to be supplied/interrupted, a power supply circuit (POWS) 3 for supplying the operation power to the internal circuit 2, and a system control circuit (SYSCNT) 4 for controlling resetting, a low power consumption state, and the like of the microcomputer in a centralized manner. The internal circuit 2 has a plurality of power regions in each of which operation power can be supplied/interrupted. In a first power region, a first circuit (1stCT) 11 such as a ROM is formed. In a second power region, a second circuit (2ndCT) 12 is formed such as a logic circuit (LOG) in which input/output control circuits such as a central processing unit (CPU), a direct memory access controller (DMAC), an interruption controller (IRCNT), a bus controller (BSCNT), and a timer and other peripheral circuits are coupled to each other via a bus or the like. In a third power region, a third circuit (3rdCT) 13 such as a RAM is formed. The first and third circuits 11 and 13 are accessed by a bus master module such as the CPU, DMAC, or the like included in the second circuit 12.

An external output circuit (EXOUT) 5 and an external input circuit (EXIN) 6 generically shown as external interface circuits are used for outputting an address, inputting/outputting data, inputting an external interrupt request signal, outputting of a external bus access control signal, and the like. POUT generically indicates an external output terminal, and PIN generically indicates an external input terminal. The external input terminal PIN includes an external interrupt terminal. A clock oscillator (OSC) (clock pulse generator) 7 generates an internal clock signal CK synchronized with a clock signal input from an external clock terminal PCK.

The power supply circuit 3 generates internal power supply voltages vdd1, vdd2, and vdd3 by decreasing an external power supply voltage VCC supplied from an external power supply terminal PVCC. The external power supply voltage is, for example, 5V or 3.3V. The internal power supply voltages vdd1, vdd2, and vdd3 are, for example, 1.5V. The internal power supply voltage vdd1 is an operation power supply of the first circuit 11. The internal power supply voltage vdd2 is an operation power supply of the second circuit 12. The internal power supply voltage vdd3 is an operation power supply of the third circuit 13. Since supply and interruption of the internal power supply voltages vdd1, vdd2, and vdd3 are controlled in accordance with the low power consumption mode, inconstant propagation preventing circuits 14 and 15 are disposed. The inconstant propagation preventing circuit 14 selectively prevents propagation of an inconstant signal from the first circuit 11 to the second circuit 12 in the low consumption power mode in which the operation power supply of the first circuit 11 is interrupted. The inconstant propagation preventing circuit 15 selectively prevents propagation of an inconstant signal from the second circuit 12 to the third circuit 13 in the low consumption power mode in which the operation power supply of the second circuit 12 is interrupted. Interface signals between the first circuit 11, the second circuit 12, and the third circuit 13 in which the inconstant propagation preventing circuits 14 and 15 are not interposed are not shown.

Level-down shifters (LDS) 16 shift down the signal amplitude of the external power supply voltage VCC to the signal amplitude of the internal power supply voltages vdd1, vdd2, and vdd3. The level-down shifters 16 are disposed between the system control circuit 4, the clock oscillator 7, and the external input circuit 6 and the second circuit 12. Level-up shifters (LUS) 17 shift up the signal amplitude of the internal power supply voltage to the signal amplitude of the external power supply voltage. The level-up shifter 17 is disposed between the external output circuit 5 and the system control circuit 4 and the second circuit 12.

The system control circuit 4 receives a reset signal RES supplied from an external reset terminal PRES, a software standby transient signal S_STBY, a software standby cancel signal R_STBY, and a register read/write signal RR/W supplied from the second circuit 12 via the level-up shifter 17, and the like. According to the state of the input signals, the system control circuit 4 controls a resetting process of the microcomputer 1, a low power consumption state, and the like. As one of the controls, the system control circuit 4 performs a control of supply/interruption and cancellation of the internal power supply voltages vdd1, vdd2, and vdd3 by using a power supply circuit control signal 20 to be sent to the power supply circuit 3. Accompanying the control of supply/interruption of the internal power supply voltages vdd1, vdd2, and vdd3, the system control circuit 4 performs an output fixing control using output fixing control signals 21, 22, and 23 on the level-up shifter 17 and the inconstant propagation preventing circuits 14 and 15. Further, the system control circuit 4 performs a control of oscillation stop and cancellation using an oscillator control signal 25 on the clock oscillator 7 according to the resetting process or the low power consumption state which is set, an external interface control using an external output control signal 26 and an external input control signal 27 on the external output circuit 5 and the external input circuit 6, an initialization control on the second circuit 12 by using an internal circuit control signal 28, and the like. The power supply circuit control signal 21 and the output fixing control signals 21 to 24 are generated by a power supply control circuit (POWCNT) 30.

The internal state of the microcomputer 1 is broadly divided into a reset state, a CPU program executing state, and a low power consumption state. The reset state denotes an initializing operation state in which the microcomputer 1 is initialized in response to the reset signal RES. The CPU program executing state denotes a state in which the CPU of the second circuit 12 executes an operation program.

Low Power Consumption State

FIG. 2 shows a concrete example of the low power consumption state. The low power consumption state is broadly divided into a CPU sleep mode (a sleep mode), an entire module clock stop mode, a software standby mode, a deep software standby mode (a deep standby mode), and a hardware standby mode.

The hardware standby mode is set according to the state of external terminals (not shown) such as a standby terminal (STBY). In the hardware standby mode, power supply to all of the circuits except for the system control circuit 4 is stopped. The hardware standby mode is cancelled by the reset signal RES. The cancellation of hardware standby mode requires the assertion of reset signal RES and the negation of external terminals (STBY). One of the other low power consumption modes is selected according to the set state of control registers such as a standby control register SBYCR, a module stop control register MSTPCR, and a deep standby control register DPSBYCR when the CPU executes a sleep instruction. For example, the registers SBYCR and MSTPCR are disposed in the second circuit 12, and the register DPSBYCR is disposed in the system control circuit 4. The registers can be read/written by the CPU and are initialized in response to the reset instruction.

In the CPU sleep mode, supply of a clock signal to the CPU in the second circuit 12 and the other peripheral modules is stopped, and supply of the operation power to all of the circuits is held. In the diagram, "stop (hold)" expresses a state where the operation power is supplied even when a clock supply is stopped and the internal state of the circuit is held static. The CPU sleep mode can be cancelled by an interrupt signal from the inside or the outside since the interrupt controller of the second circuit 12 can operate. In the CPU sleep mode, a clock signal can be supplied to all the peripheral modules other than CPU.

In the entire module clock stop mode, the supply of clocks is stopped except for a part of the peripheral circuits such as a watchdog timer in the second circuit 12, and the supply of operation power is maintained to all of the circuits. Since the interrupt controller in the second circuit 12 can operate, the entire module clock stop mode can be cancelled by the software standby cancellation signal R_STBY generated in response to an interrupt request from the inside or the outside.

In the software standby mode, generation and supply of clocks is totally stopped, power supply to the first circuit 11 (ROM) is stopped, and power supply to the other circuits such as the second circuit 12 and the third circuit 13 is maintained and operation is stopped (held). In the software standby mode, the supply of clocks to the second circuit 12 is stopped. Even when clocks are not supplied, if operation power is supplied, the interrupt controller (IRCNT) included in the second circuit 12 can generate the software standby cancellation signal R_STBY in response to an interrupt request signal from the outside. By the signal R_STBY, the software standby mode can be cancelled.

In the deep software standby mode, supply or interruption of operation power to the third circuit (RAM) 13 can be selected, and the supply of operation power to the other circuits is interrupted. In the deep software standby mode in which the second circuit 12 is disabled, a predetermined interrupt terminal (cancellation factor terminal) in external interrupt terminals is directly supplied to the system control circuit 4, and the deep software standby mode can be cancelled via the cancellation factor terminal.

Although not limited, the standby control register SBYCR has a software standby bit (SSBY) or the like. When SSBY=0, an instruction is given to shift to the CPU sleep mode after execution of the sleep instruction by the CPU. When SSBY=1, an instruction is given to shift to the software standby mode or the deep software standby mode after execution of the sleep instruction by the CPU. The deep standby control register DPSBYCR has a deep standby bit (DPSBY) and an RAM turn-off bit (RAMCUT). When SSBY=1 and the deep standby bit DPSBY=0, the software standby mode is instructed. When SSBY=1 and DPSBY=1, the deep software standby mode is instructed. When RAMCUT=0, an instruction of not interrupting the operation power of the third circuit 13 (RAM) is given. When RAMCUT=1, an instruction of interrupting the operation power of the third circuit 13 (RAM) is given.

In the deep software standby mode, the range of power interruption is wider and the power consumption is lower as compared with the software standby mode. In the deep software standby mode, an operation form of storing data for resetting in the RAM is selected and an operation of resetting to the previous state quicker than the hardware standby mode is enabled.

FIG. 3 shows a state of supply and interruption of operation power to the internal circuit 2 according to the internal state of the microcomputer 1. In the diagram, ON[VDD] denotes that the decreased corresponding operation power (vdd1, vdd2, or vdd3) is supplied. OFF[GND] denotes that the corresponding operation power (vdd1, vdd2, or vdd3) is interrupted. In particular, "(hold)" in the inactive state means that internal data is held statically in a register in the CPU or the like. "(reset)" means that internal data is initialized. "(indeterminate)" means that internal data is indeterminate (unstable).

System Control Circuit

Figure 4:
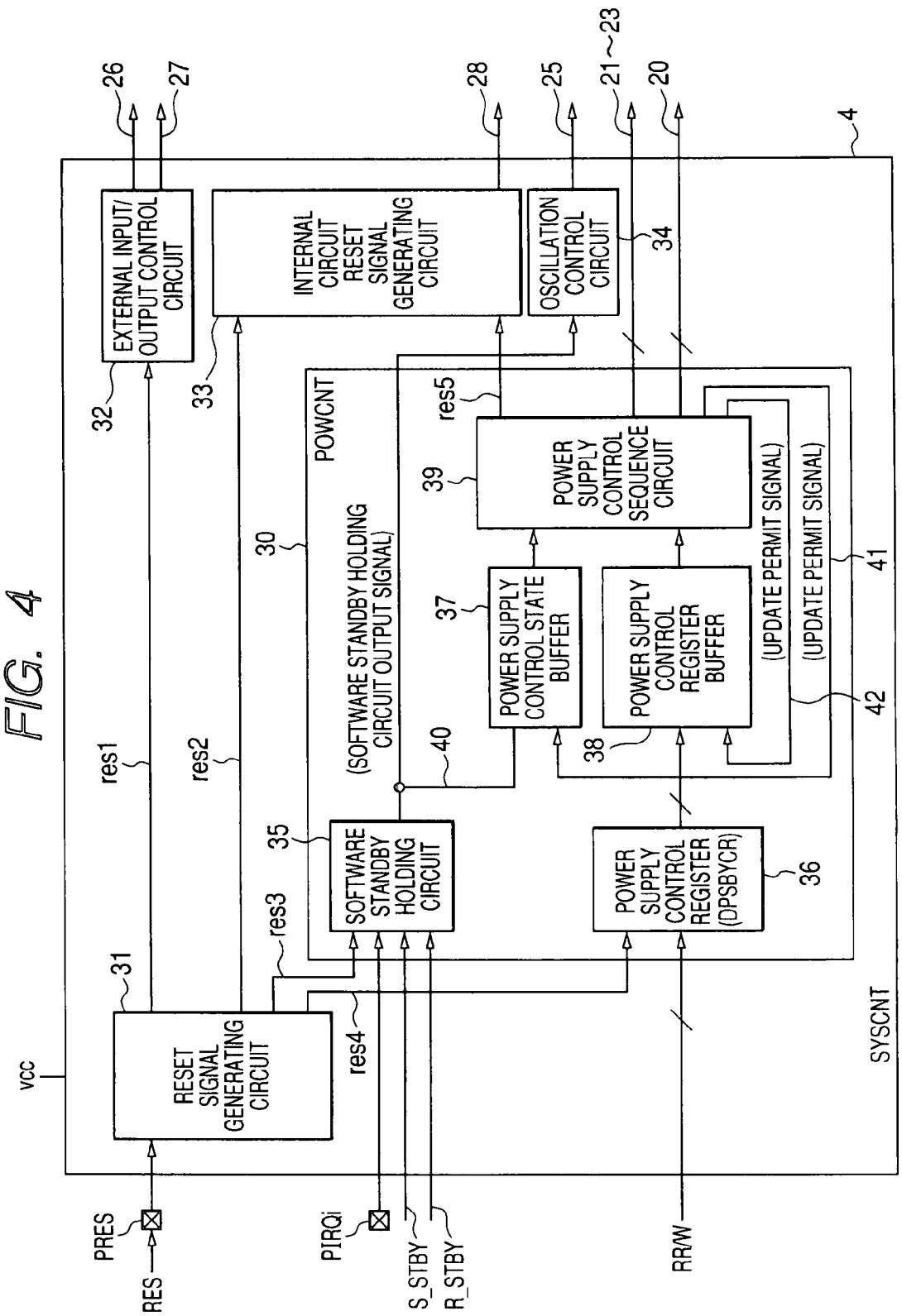
FIG. 4 is a block diagram of a system control circuit.

FIG. 4 shows the system control circuit 4. The system control circuit 4 has a reset signal generating circuit 31, an external input/output control circuit 32, an internal circuit reset signal generating circuit 33, an oscillation control circuit 34, and a power supply control circuit (POWCNT) 30. The reset signal generating circuit 31 generates internal reset control signals res1 to res4 in accordance with an initialization instruction given by the reset signal RES input from the external reset terminal PRES. The external input/output control circuit 32 enables the operation of the external input circuit 6 and the external output circuit 5 in response to the internal reset control signal res1. The internal circuit reset signal generating circuit 33 initializes the internal circuit 2 by the internal circuit control signal 28 in response to the internal reset control signal res2.

The power supply control circuit 30 has, as storage circuits, a software standby holding circuit 35 and a power supply control register (DPSBYCR) 36, a power supply control state buffer 37 and a power supply control register buffer 38 for receiving outputs of the storage circuits 35 and 36, respectively, and a power supply control sequence circuit 39 for performing power supply control on the basis of outputs of the power supply control state buffer 37 and the power supply control register buffer 38.

The software standby holding circuit 35 is constructed, by, for example, a set/reset-type flip flop which is set by the software standby transition signal S_STBY (output signal 40=high level), and is reset by the software standby cancellation signal R_STBY, the interrupt signal from a predetermined external interrupt terminal PIRQi, or the internal reset signal res3 (output signal 40=low level). The high level of the output signal, 40 of the software standby holding circuit 35 denotes that the software standby mode or the deep software standby mode is instructed. The low level of the signal 40 indicates that the software standby mode or the deep software standby mode is cancelled. The oscillation control circuit 34 stops oscillation operation on the clock oscillator 7 at a predetermined timing in response to a change to the high level of the signal 40. The oscillation control circuit 34 restarts the oscillation operation on the clock oscillator 7 at a predetermined timing in response to a change to the low level of the signal 40.

When writing is enabled by the register read/write signal RR/W, the power supply control register (DPSBYCR) 36 can optionally write control data (low power consumption mode data) by a CPU or the like. When reset is instructed by the internal reset signal res4, the control data is initialized. The initialized control data is a value instructing the software standby mode.

The power supply control state buffer 37 receives and holds an output signal 40 of the software standby holding circuit 35. The holding operation is limited to time in which updating is permitted by an update enable signal 41 (=high level) output from the power supply control sequence circuit 39.

The power supply control register buffer 38 receives and holds control data set in the power supply control register 36. The holding operation is limited to time in which updating is permitted by an update enable signal 42 (=high level) output from the power supply control sequence circuit 39.

The power supply control sequence circuit 39 refers to the control data held in the power supply control register 36 via the power supply control register buffer 38 and refers to the signal 40 held in the software standby holding circuit 35 via the power supply control state buffer 37. Based on the signals, the power supply control sequence circuit 39 performs the transition control of interruption and supply of the operation powers vdd1, vdd2, and vdd3 with the power supply control signal 20, and also performs the transition control of output fixation of the inconstant propagation preventing circuits 14 and 15 and the level-up shifter 17 with the output fixing control signals 21 to 23. When the deep software standby mode is cancelled by the interrupt signal from the predetermined external interrupt terminal PIRQi, the power supply control sequence circuit 39 generates an internal reset signal res5 and initializes the internal circuit by the signal 28.

A change from the low level to the high level of the value held in the power supply control state buffer 37 is regarded as a trigger of start of the power supply interrupting operation. A change from the high level to the low level is regarded as a trigger of the operation of cancelling the power supply interruption. The control sequence of the power supply interruption and the interruption cancellation is determined by the control data held in the power supply control register buffer 38. When the control data instructs the software standby mode, interruption of power supply to the internal circuit 2 is not performed. Consequently, if the control data instructs the software standby mode when cancellation of the power supply interruption is instructed, the power supply control sequence circuit 39 immediately starts power supply to the entire internal circuit 2. On the other hand, when the deep software standby mode is instructed, for the third circuit (RAM) 13 to which power operation is supplied and which can hold internal data, the interruption of power supply to the first circuit (ROM) 11 and the second circuit (LOG) 12 in the power supply interrupted state is cancelled, and the output fixation of the inconstant propagation preventing circuit 15 is not cancelled. Therefore, when transition to the software standby mode or the deep software standby mode is completed and, after that, the operation mode is cancelled by an external reset, the power supply control sequence circuit 39 does not refer to the power supply control register 36 (storage to the power supply control register buffer 38 is not permitted). During transition to the software standby mode or the deep software standby mode, if the operation mode is cancelled by an external reset, the power supply control sequence circuit 39 does not refer to the data held in the software standby holding circuit 35 (storage to the power supply control state buffer 37 is not permitted) until the transition to the software standby mode or the deep software standby mode is completed.

Figure 5:
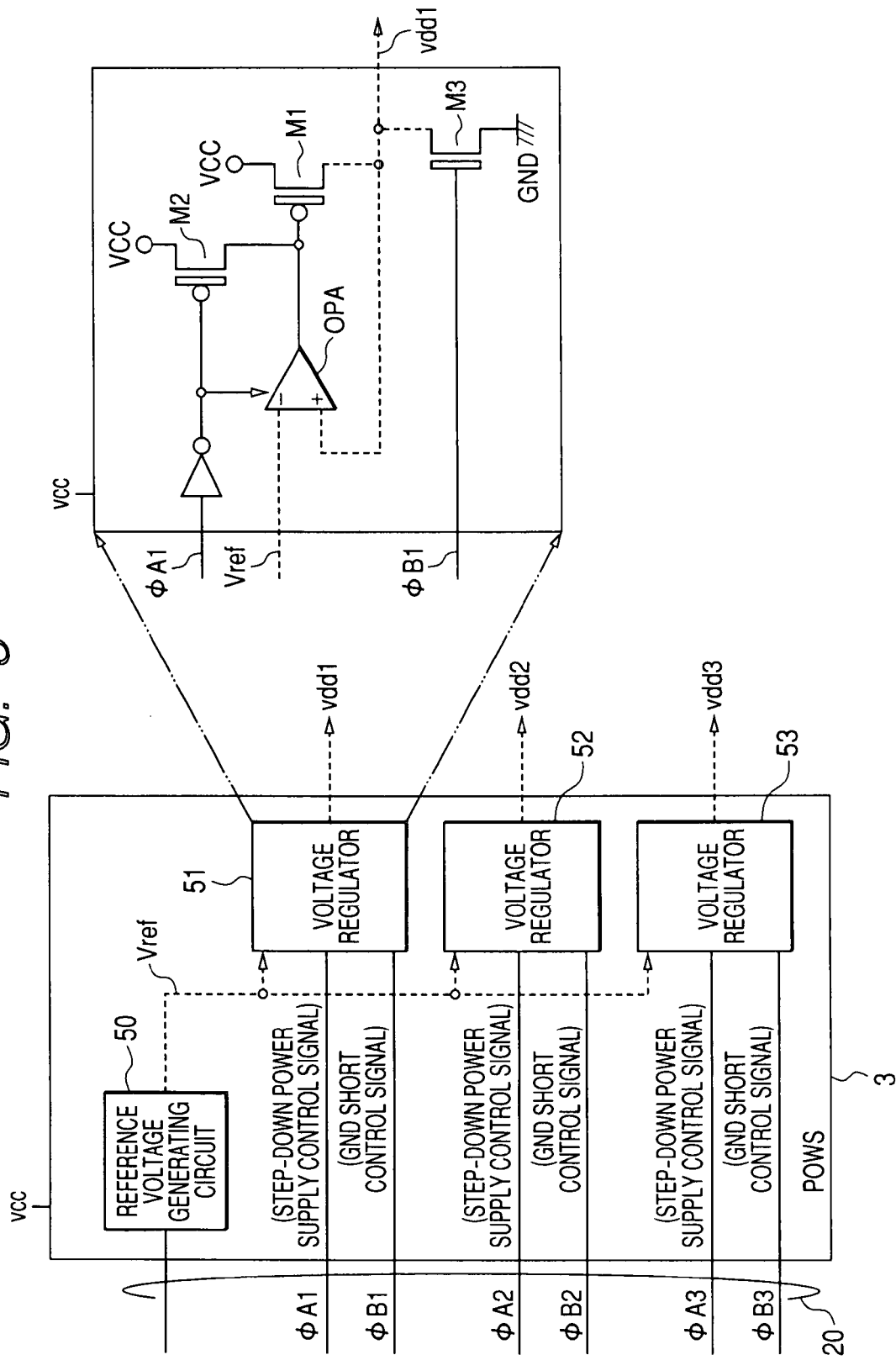
FIG. 5 is a circuit diagram showing an example of a power supply circuit.

FIG. 5 shows an example of the power supply circuit 3. The power supply circuit 3 has a reference voltage generating circuit 50 for generating a reference voltage Vref, a voltage regulator 51 for generating a power supply voltage vdd1, a voltage regulator 52 for generating a power supply voltage vdd2, and a voltage regulator 53 for generating a power supply voltage vdd3. The voltage regulator 51 has: a clamp circuit for negative-feedback-controlling conductance of a MOS transistor M1 so that drain voltage of a p-channel-type clamp MOS transistor M11 having a gate to which an output of an operational amplifier OPA is connected coincides with a reference voltage Vref, thereby clamping the drain voltage to a voltage equal to the reference voltage Vref; an n-channel-type discharge MOS transistor M3 for selectively coupling the drain of the clamp MOS transistor M1 to the ground potential; and a p-channel-type cut-off MOS transistor M2 for selectively turning off the clamp MOS transistor M1. A step-down power supply control signal φA1 performs a control of activating the operational amplifier OPA and a control of switching the cut-off MOS transistor M2. By the high level of the step-down power supply control signal φA1, the operational amplifier OPA is made inactive, and the cut-off MOS transistor M2 is controlled to the on state. A step-down power supply control signal φB1 performs a control of switching the MOS transistor M3. For the property of the voltage regulator 51 using the clamp circuit, in the power supply interruption, first, the MOS transistor M2 is turned on, the MOS transistor M1 is cut off, and the MOS transistor M3 is turned on. At the time of cancelling the power supply interruption, in reverse order, the MOS transistor M3 is turned off, the MOS transistor M2 is turned off, and the negative feedback control by the operational amplifier OPA has to be started. In the reverse order, feed-through current flows from the power supply voltage VCC to the ground GND, and wasteful power consumption increases. The other voltage regulators 52 and 53 are similarly constructed.

Figure 6:
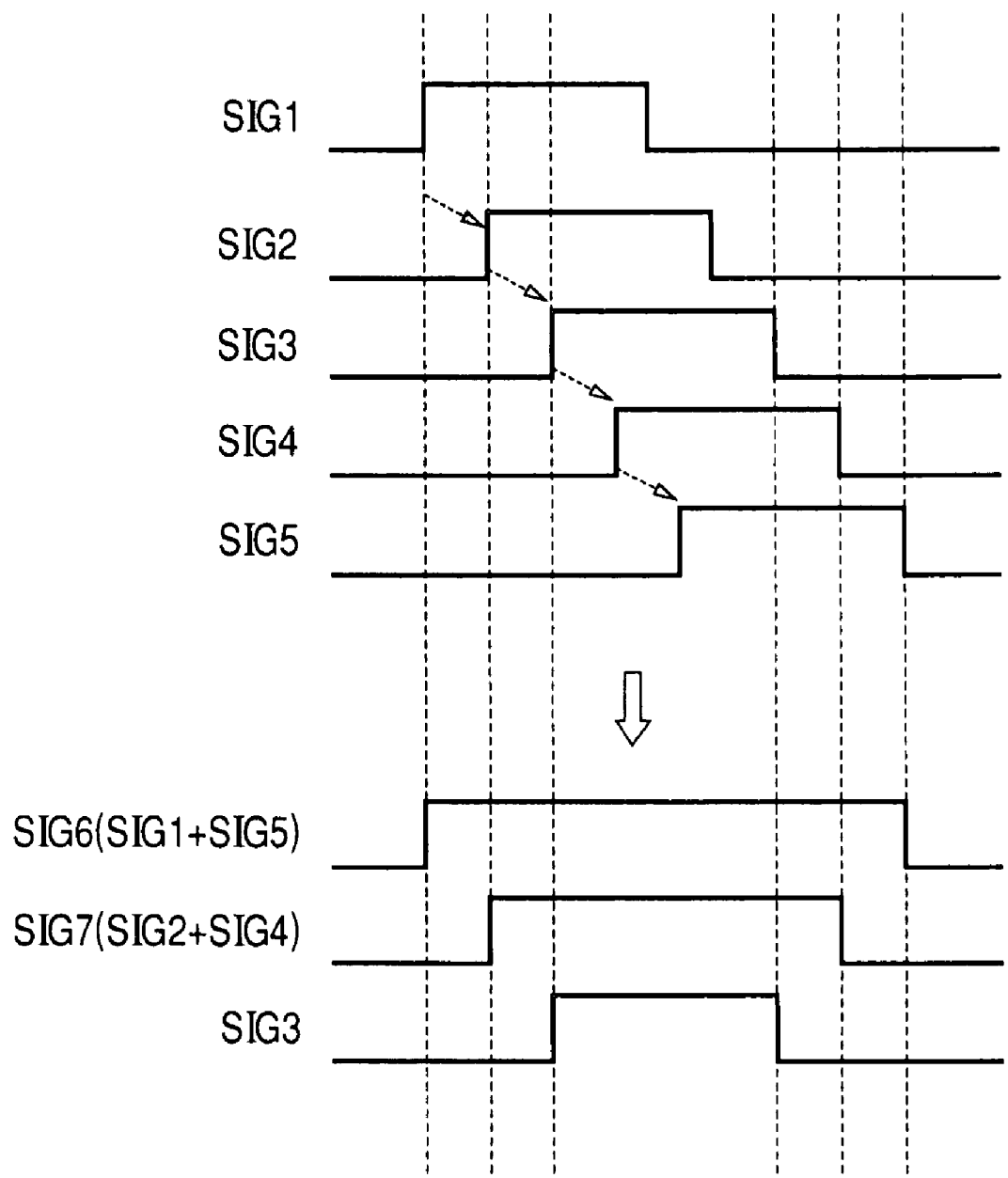
FIG. 6 is a timing waveform chart showing an example of a method of generating a timing signal in a power supply control sequence circuit.

To specify the transition order of the power supply control signals φA1 (φA2, φA3) and φB1 (φB2, φB3) and to specify the transition order of the power supply control signals and the output fixing control signals 21 to 23, for example, as shown in FIG. 6, the power supply control sequence circuit 39 sequentially delays the transition from the low level to the high level by using OR signals for a plurality of signals obtained by sequentially delaying a signal changing from the low level to the high level, and generates a control signal for sequentially resetting the signals to the low level in order from a signal having large transition delay. In FIG. 6, it is assumed that signals SIG2 to SIG5 are signals obtained by sequentially delaying a signal SIG1, a signal SIG6 is an OR signal of the signals SIG1 and SIG5, and a signal SIG7 is an OR signal of the signals SIG2 and SIG4. When it is assumed that the signal SIG1 is a signal held by the power supply control state buffer 37, it is sufficient to use the signal SIG6 as an output fixed control signal of the inconstant propagation preventing circuit, the signal SIG7 as the power supply control signal φA1 (φA2, φA3), and the signal SIG3 as the power supply control signal φB1 (φB2, φB3). By such timing control, after an output of the inconstant propagation preventing circuit is clamped, the power supply is interrupted. After the power supply interruption is cancelled, the fixation of the output of the inconstant propagation preventing circuit is cancelled. Consequently, at the time of interrupting power supply and at the time of cancelling the interruption, internal data to be held in a circuit whose power is maintained is not undesirably destroyed. After cut-off of the MOS transistor M2, the MOS transistor M3 is turned on, and the power supply is interrupted. At the time of cancelling the power supply interruption, first, the MOS transistor M3 is cut off and, after that, the clamping operation using the MOS transistor M1 starts. Thus, an undesired flow-through current is not generated.

In the control of the power supply control sequence circuit 39, when the operation mode is cancelled during transition to the software standby mode or deep software standby mode by the control of stopping reference to the data held in the software standby holding circuit 35 (inhibiting storage of data to the power supply control state buffer 37) until the transition to the software standby mode or deep software standby mode completes, delay started by the change of rise of the signal SIG1 and generation of the internal power supply interruption timing by the OR operation is not interrupted as shown in FIG. 6. When the signal SIG1 changes undesirably during the period from the rising edge of the signal SIG1 to a change of rise of the signal SIG3, the waveforms of the signals SIG6, SIG7, and SIG3 are disturbed and there is the possibility that the normal control order cannot be maintained.

Power Supply Control Sequence

Figure 7:
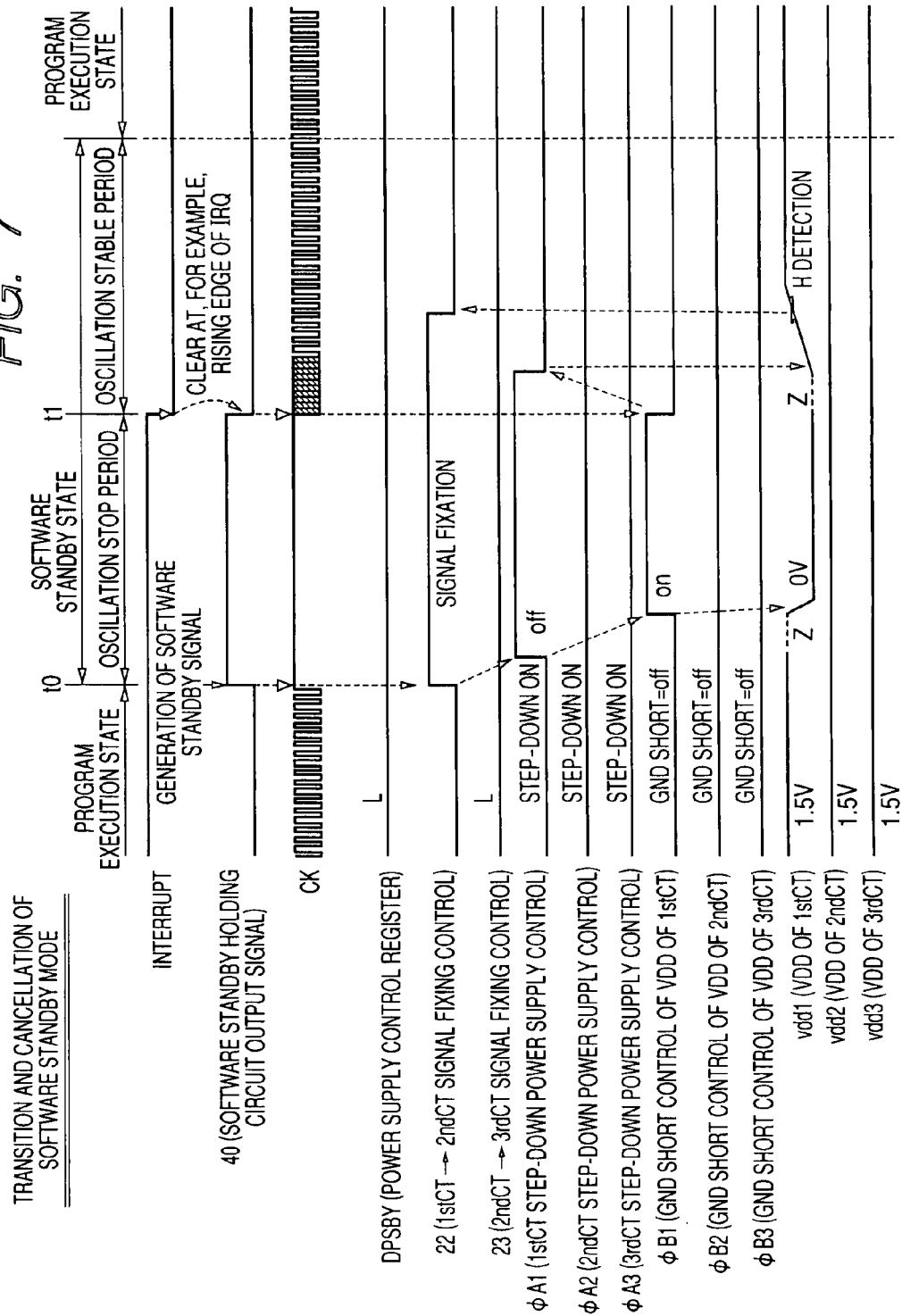
FIG. 7 is a timing chart showing control timings of transition to a software standby mode and cancellation by an interruption.

FIG. 7 shows control timings of transition of the software standby mode and cancellation by an interruption. When a software standby signal is generated (SSBY=1, DPSBY=0, and execution of a sleep instruction) at time t0, in response to it, the power supply control sequence circuit 39 sequentially performs operations of stopping clocks, fixing an output of the inconstant propagation preventing circuit 14, cutting off the clamp MOS transistor M1 by sending the signal φA1 to the first circuit 11, and turning off the discharge MOS transistor M3 by sending the signal φB1 to the first circuit 11, thereby interrupting power supply to the first circuit 11 and the like and shifting to the software standby mode. When an interruption request is generated at time t1, an output change of the software standby holding circuit 35 is transmitted to the power supply control sequence circuit 39 via the power supply control state buffer 37. According to control data (SSBY=1, DPSBY=0) in the power supply control register buffer 38, the power supply control sequence circuit 39 sequentially performs operations of restarting supply of clocks, turning off the discharge MOS transistor M3 by the signal φB1 to the first circuit 11, turning on the clamp MOS transistor M1 by the signal A1φ to the first circuit 11, and cancelling the output fixation of the inconstant propagation preventing circuit 14, thereby cancelling the software standby mode. The output fixation of the inconstant propagation preventing circuit 14 is cancelled on condition that the operation voltage vdd1 has reached an operation guarantee voltage (H detection).

Figure 8:
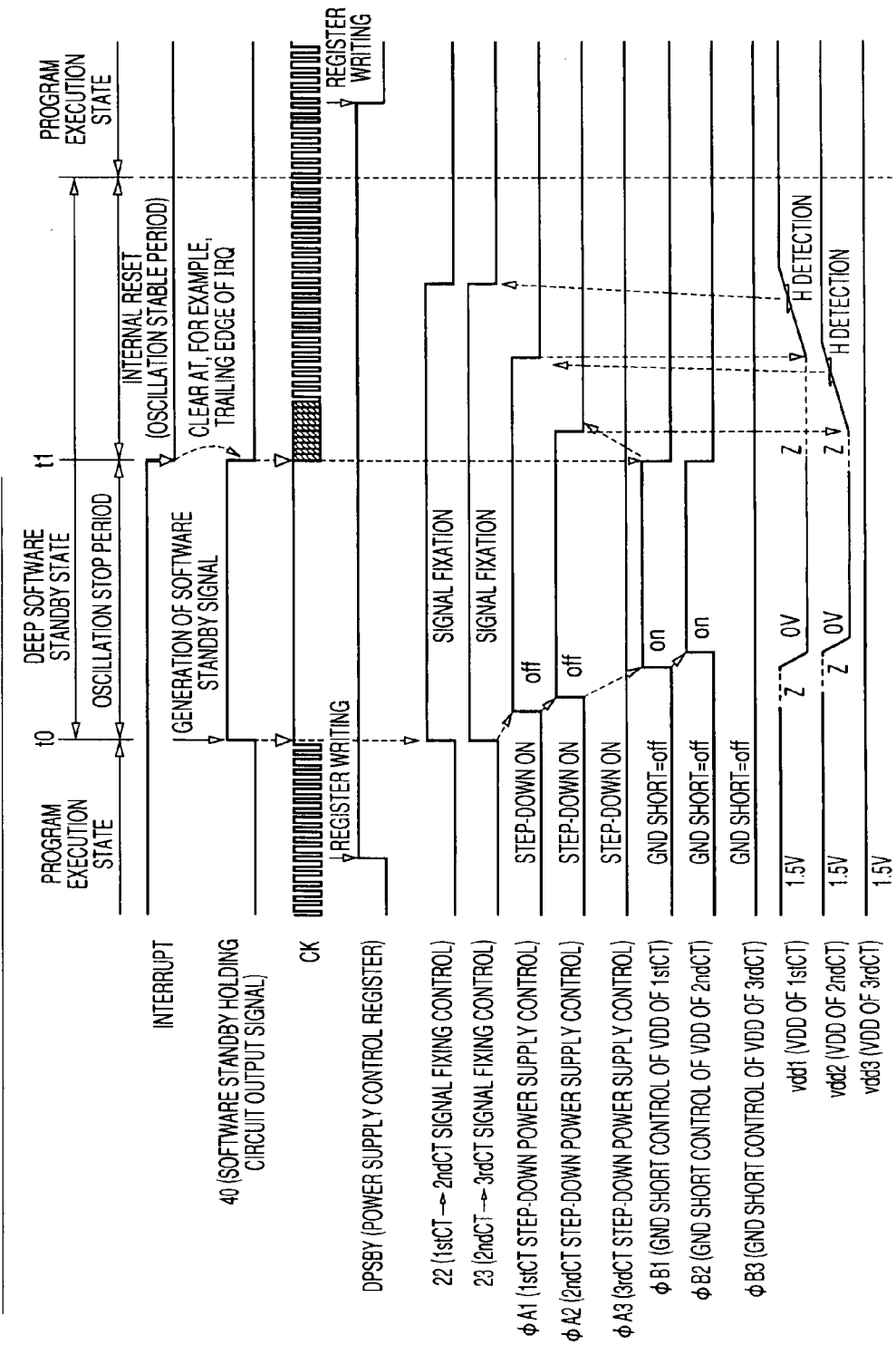
FIG. 8 is a timing chart showing control timings of transition to a deep software standby mode and cancellation by an interruption.

FIG. 8 shows control timings of cancellation of the deep software standby mode and cancellation by an interruption. When a deep software standby signal is generated (SSBY=1, DPSBY=1, RAMCUT=0, and execution of a sleep instruction) at time t0, in response to it, the power supply control sequence circuit 39 sequentially performs operations of stopping clocks, clamping outputs of the inconstant propagation preventing circuits 14 and 15, cutting off the clamp MOS transistor M1 by sending the signal φA1 to the first circuit 11, cutting off the clamp MOS transistor M1 by sending the signal φA2 to the second circuit 12, turning on the discharge MOS transistor M3 by sending the signal φB1 to the first circuit 11, and turning on the discharge MOS transistor M3 by sending the signal φB2 to the second circuit 12, thereby interrupting power supply to the first and second circuits 11 and 12, and shifting to the deep software standby mode. When an interruption request is generated at time t1, an output change of the software standby holding circuit 35 is transmitted to the power supply control sequence circuit 39 via the power supply control state buffer 37. According to control data (SSBY=1, DPSBY=1, and RAMCUT=0) in the power supply control register buffer 38, the power supply control sequence circuit 39 sequentially performs operations of restarting supply of clocks, turning off the discharge MOS transistor M3 by the signal φB2 to the second circuit 12, turning off the discharge MOS transistor M3 by the signal φB1 to the first circuit 11, turning on the clamp MOS transistor M1 by the signal φA2 to the second circuit 12, turning on the clamp MOS transistor M1 by the signal φA1 to the first circuit 11, and cancelling the clamping of the outputs of the inconstant propagation preventing circuits 14 and 15, thereby cancelling the deep software standby mode. In the example, since both of the internal power supply voltages vdd1 and vdd2 are objects to be interrupted, theoretically, it is not requested to clamp an output of the inconstant propagation preventing circuit 14 from the first circuit 11 to the second circuit 12. However, to simplify the control logic of the power supply control sequencer, both of the inconstant propagation preventing circuits 14 and 15 are set as objects to be controlled.

Figure 9:
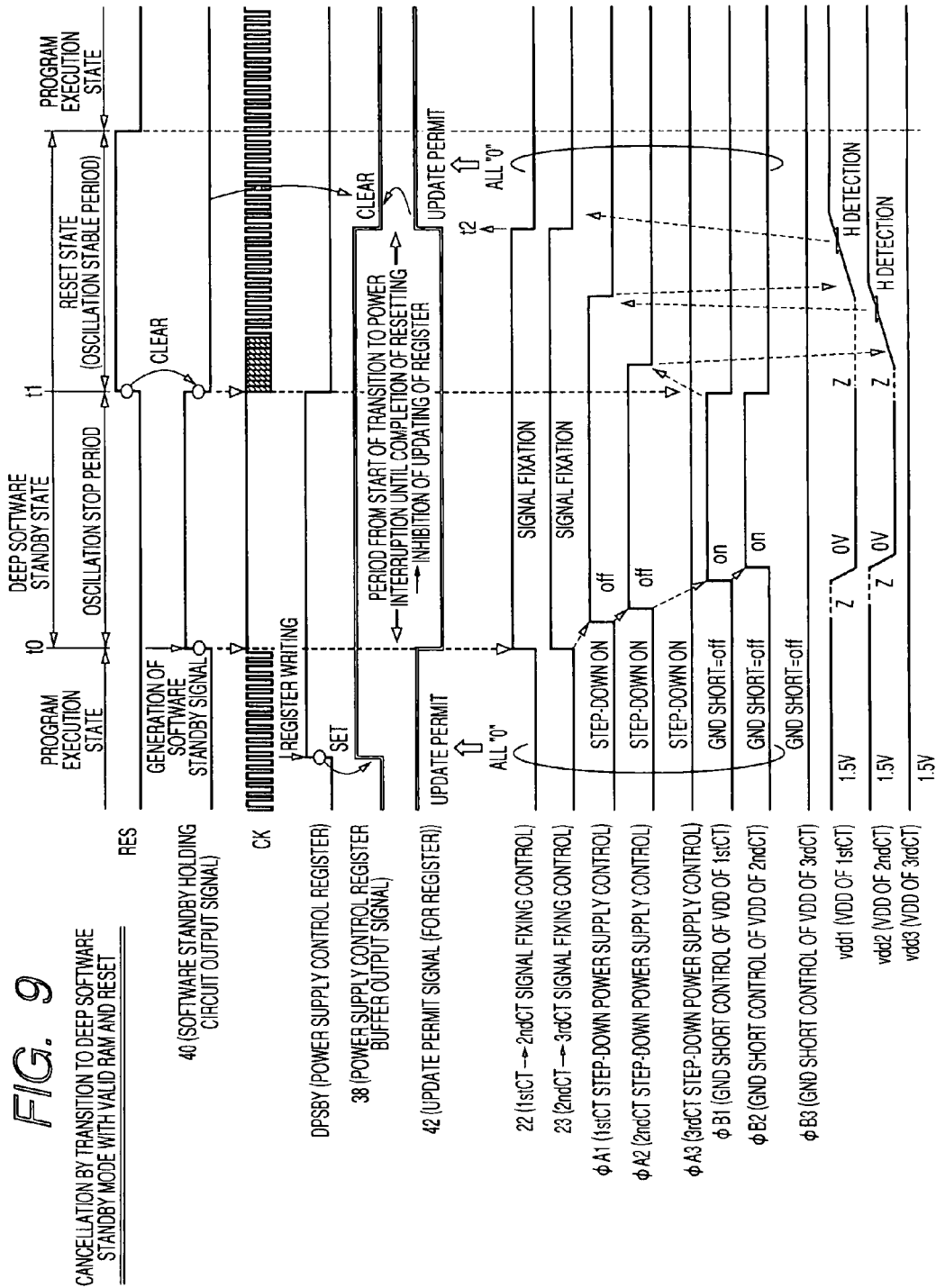
FIG. 9 is a timing chart showing control timings of transition to the deep software standby mode and cancellation by a reset.

FIG. 9 shows control timings of cancellation of the deep software standby mode and cancellation by a reset. When a deep software standby signal is generated (SSBY=1, DPSBY=1, RAMCUT=0, and execution of a sleep instruction) at time t0, in response to it, the power supply control sequence circuit 39 sequentially performs operations of stopping clocks, clamping outputs of the inconstant propagation preventing circuits 14 and 15, cutting off the clamp MOS transistor M1 by sending the signal φA1 to the first circuit 11, cutting off the clamp MOS transistor M1 by sending the signal φA2 to the second circuit 12, turning on the discharge MOS transistor M3 by sending the signal φB1 to the first circuit 11, and turning on the discharge MOS transistor M3 by sending the signal φB2 to the second circuit 12, thereby interrupting power supply to the first and second circuits 11 and 12, and shifting to the deep software standby mode. When an initialization instruction is given by the reset signal RES at time t1, the software standby holding circuit 35 is reset, and the power supply control register 36 is initialized to a state of instructing the software standby mode (DPSBY=0). In this case as well, an output change of the software standby holding circuit 35 is transmitted to the power supply control sequence circuit 39 via the power supply control state buffer 37. According to control data (SSBY=1, DPSBY=1, and RAMCUT=0) in the power supply control register buffer 38, the power supply control sequence circuit 39 sequentially performs operations of restarting supply of clocks, turning off the discharge MOS transistor M3 by the signal φB2 to the second circuit 12, turning off the discharge MOS transistor M3 by the signal φB1 to the first circuit 11, turning on the clamp MOS transistor M1 by the signal φA2 to the second circuit 12, turning on the clamp MOS transistor M1 by the signal φA1 to the first circuit 11, and cancelling the clamping of the outputs of the inconstant propagation preventing circuits 14 and 15, thereby cancelling the deep software standby mode at time t2. The update enable signal 42 is set to the low level indicative of update inhibition until the time t2. During the period, updating of the value of the power supply control register buffer 38 with the value of the initialized power supply control register 36 is stopped. After that, the value of the power supply control register buffer 38 is updated with the value of the initialized power supply control register 36. Although not shown in FIGS. 7 and 8, the control by the update enable signal 42 is performed in a manner similar to that in the case of FIG. 9.

Figure 10:
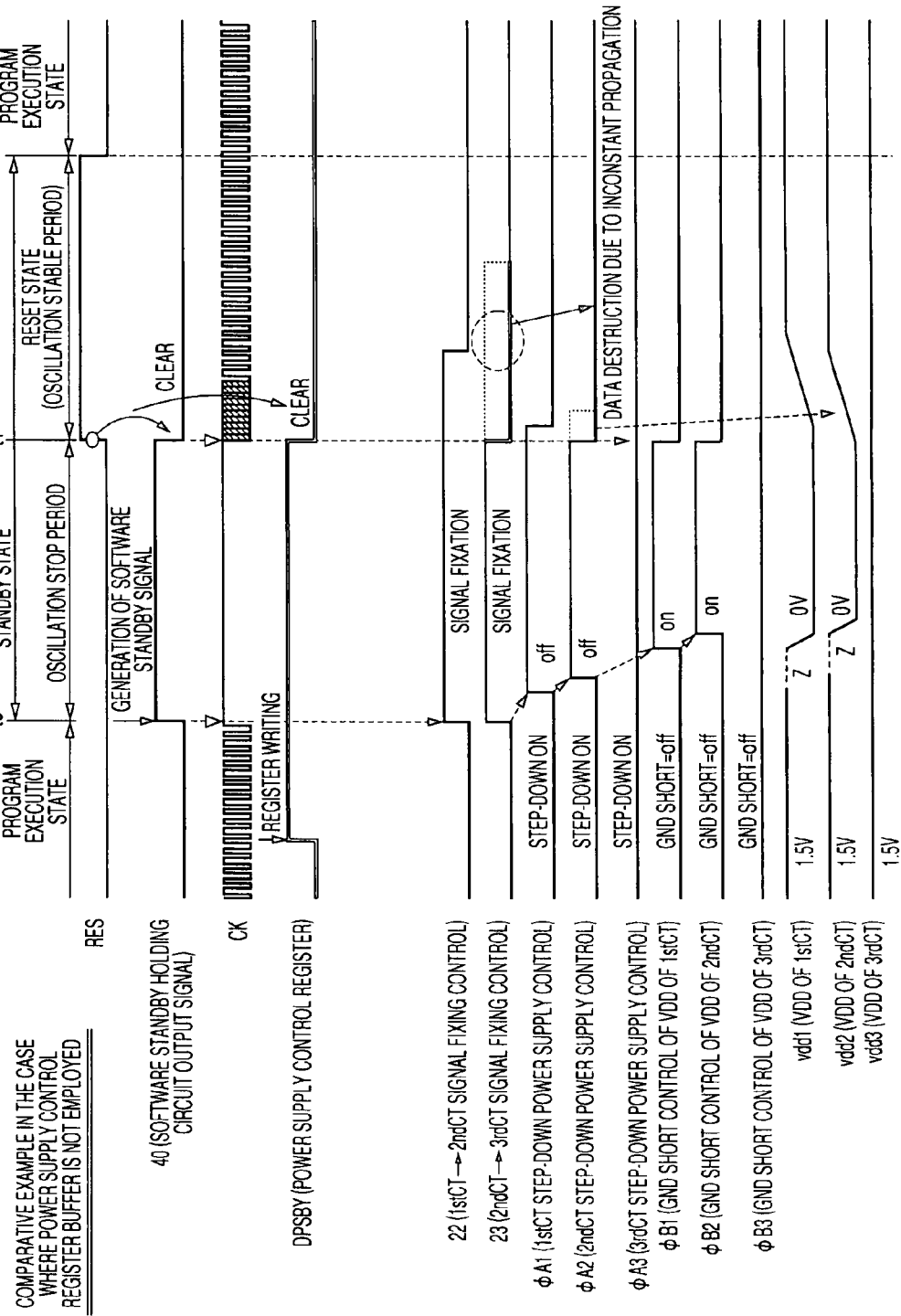
FIG. 10 is a timing chart showing a comparative example of the case where update permission control is not performed on a power supply control register buffer (the case where the buffer is not provided).

FIG. 10 shows a comparative example of the case where the update permit control is not performed on the power supply control register buffer 38 (the case where the buffer is not provided). The other conditions are the same as those of FIG. 9. When the set value of the power supply control register 36 initialized with the set value of the software standby mode in response to the reset (time t1) is directly referred to by the power supply control sequence circuit 39, the sequence circuit 39 starts internal control for shifting the software standby mode to a program execution state by using the reset instruction of the software standby holding circuit as a trigger, starts supplying the operation power to the first and second circuits 11 and 12 and, simultaneously, starts operation of cancelling the state of clamping the output of the inconstant propagation preventing circuit 15. In this case, in the deep software standby mode, it is feared that the third circuit (RAM) 13 receives inconstant propagation from the inconstant propagation preventing circuit 15 whose output is unclamped before the operation power supply of the second circuit is stabilized and data held in the RAM is undesirably destroyed.

Figure 11:
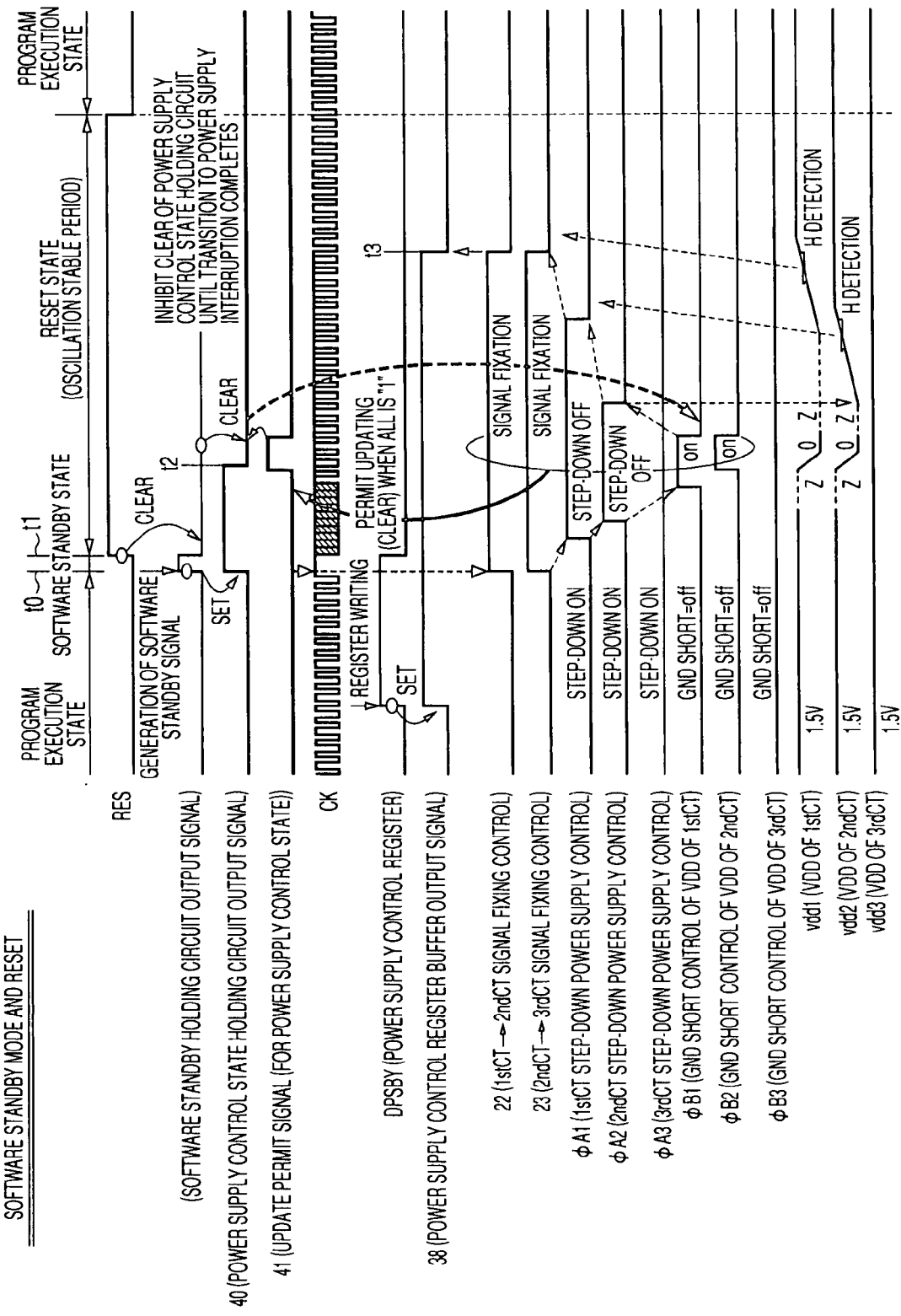
FIG. 11 is a timing chart showing control timings in the case where competition occurs between transition to the deep software standby mode and cancellation by the reset.

FIG. 11 shows control timings in the case where competition occurs between transition to the deep software standby mode and cancellation by the reset. When a deep software standby signal is generated (SSBY=1, DPSBY=1, RAM- CUT=0, and execution of a sleep instruction) at time t0, in response to it, the power supply control sequence circuit 39 sequentially performs operations of stopping clocks, clamping outputs of the inconstant propagation preventing circuits 14 and 15, cutting off the clamp MOS transistor M1 by sending the signal φA1 to the first circuit 11, cutting off the clamp MOS transistor M1 by sending the signal φA2 to the second circuit 12, turning on the discharge MOS transistor M3 by sending the signal φB1 to the first circuit 11, and turning on the discharge MOS transistor M3 by sending the signal φB2 to the second circuit 12, thereby interrupting power supply to the first and second circuits 11 and 12, and shifting to the deep software standby mode. When an initialization instruction is given by the reset signal RES at time t1 during the transition, the software standby holding circuit 35 is reset, and the power supply control register 36 is initialized to a state of instructing the software standby mode (DPSBY=0). The output change of the software standby holding circuit 35 is fetched in the power supply control state buffer 37 at a timing after completion of the interruption of the power supply to the first and second circuits 11 and 12 (time t2) for the reason that the update enable signal 41 stops updating of the power supply control state buffer 37 until the timing. When the power supply control state buffer 37 is updated at time t2, in a manner similar to the above-described operations after time t1 in FIG. 9, according to the control data (SSBY=1, DPSBY=1, and RAMCUT=0) in the power supply control register buffer 38, the power supply control sequence circuit 39 sequentially performs operations of restarting supply of clocks, turning off the discharge MOS transistor M3 by the signal φB2 to the second circuit 12, turning off the discharge MOS transistor M3' by the signal φB1 to the first circuit 11, turning on the clamp MOS transistor M1 by the signal φA2 to the second circuit 12, turning on the clamp MOS transistor M1 by the signal φA1 to the first circuit 11, and cancelling the clamping of the outputs of the inconstant propagation preventing circuits 14 and 15, thereby cancelling the deep software standby mode at time t3. The update enable signal 42 is set at the low level indicative of update inhibition until the time t3. During the period, updating of the value of the power supply control register buffer 38 with the value of the initialized power supply control register 36 is stopped. After that, the value of the power supply control register buffer 38 is updated with the value of the initialized power supply control register 36.

Figure 12:
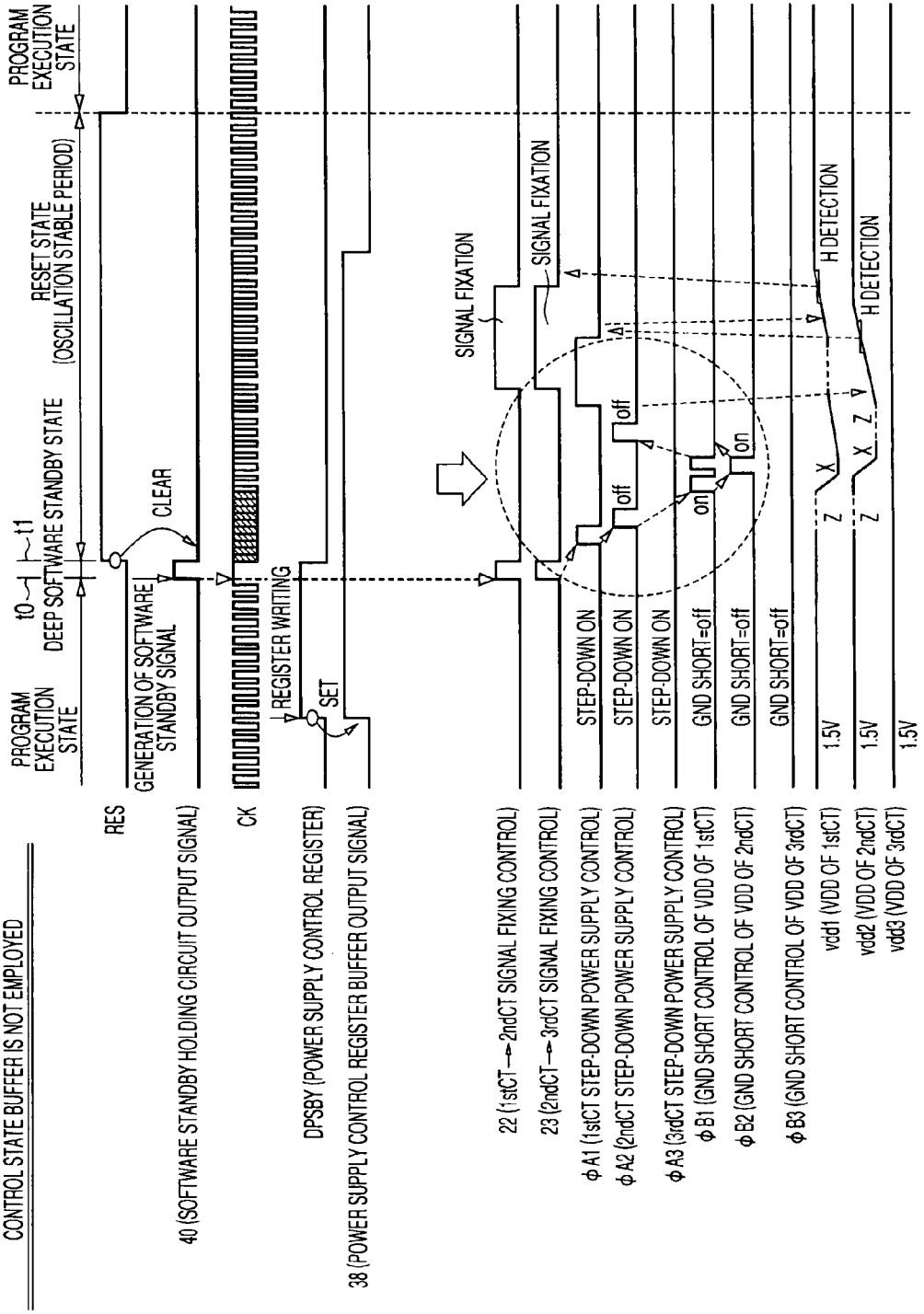
FIG. 12 is a timing chart showing a comparative example of the case where the update permission control is not performed on the power supply control register buffer (the case where the buffer is not provided).

FIG. 12 shows a comparative example of the case where the update permission control is not performed on the power supply control state buffer (the case where the buffer is not provided). The other conditions are the same as those in FIG. 11. When an initialization instruction is given by the reset signal RES at time t1 during transition to the deep software standby mode, the software standby holding circuit 35 is reset, and the power supply control register 36 is initialized to a state of instructing the software standby mode (DPSBY=0). When an output change of the software standby holding circuit 35 is directly fetched by the power supply control sequence circuit 39 without performing the update permission control for referring to the output change, as obvious from the description of FIG. 6, the output change of the software standby holding circuit 35 exerts an influence on the waveforms of the output fixing control circuits 22 and 23 and the power supply control signal 20. For example, when the clamp MOS transistor M1 is set to the on state by the low level of the signal φA1 in the voltage regulator 51 in FIG. 5, the discharge MOS transistor M3 is turned on by the high level of the signal φB1. It causes a situation that a flow-through current flows from the power supply VCC to the ground GND. Also in the voltage regulator 52 for the second circuit 12, a flow-through current flows similarly.

By the above-described power supply control sequence, when the operation power supply interruption state is cancelled by data held in the control state buffer 37 in the operation power supply interruption state, until the operation of the internal circuit 2 to which the operation power is supplied becomes assured, that is, until the voltage of the operation power reaches a specified operation guarantee voltage and there is no possibility of inconstant propagation, new reference to the low-power-consumption-mode data in the power supply control register buffer 38 is stopped. Consequently, cancelling operation according to the low-power-consumption-mode data maintained until just before the operation power supply interruption state is cancelled can be assured. Moreover, the cancelling operation can start without delay in response to an instruction of the operation of cancelling the interruption of power supply to the software standby holding circuit 35.

Since an output of the software standby holding circuit 35 is prevented from being fetched by the power supply control state buffer before completion of the interruption of the operation power supply, even if data held in the software standby holding circuit 35 and the power supply control register 36 is changed by a reset instruction or interruption request during transition to the power supply interruption state, the operation power supply interrupting operation is not interrupted. The power supply interruption sequence is not disturbed in the middle, and an undesired flow-through current does not flow from the clamp MOS transistor M1 to the discharge MOS transistor M3 due to the disturbance of the power supply interruption sequence. When the power supply interrupting operation completes, necessary data in the software standby holding circuit 35 and the power supply control register 36 has been already changed in accordance with the reset instruction or the interruption request. Consequently, after interruption of the power, transition to the next operation mode is immediately enabled.

Fixation of State at Power-On

Figure 13:
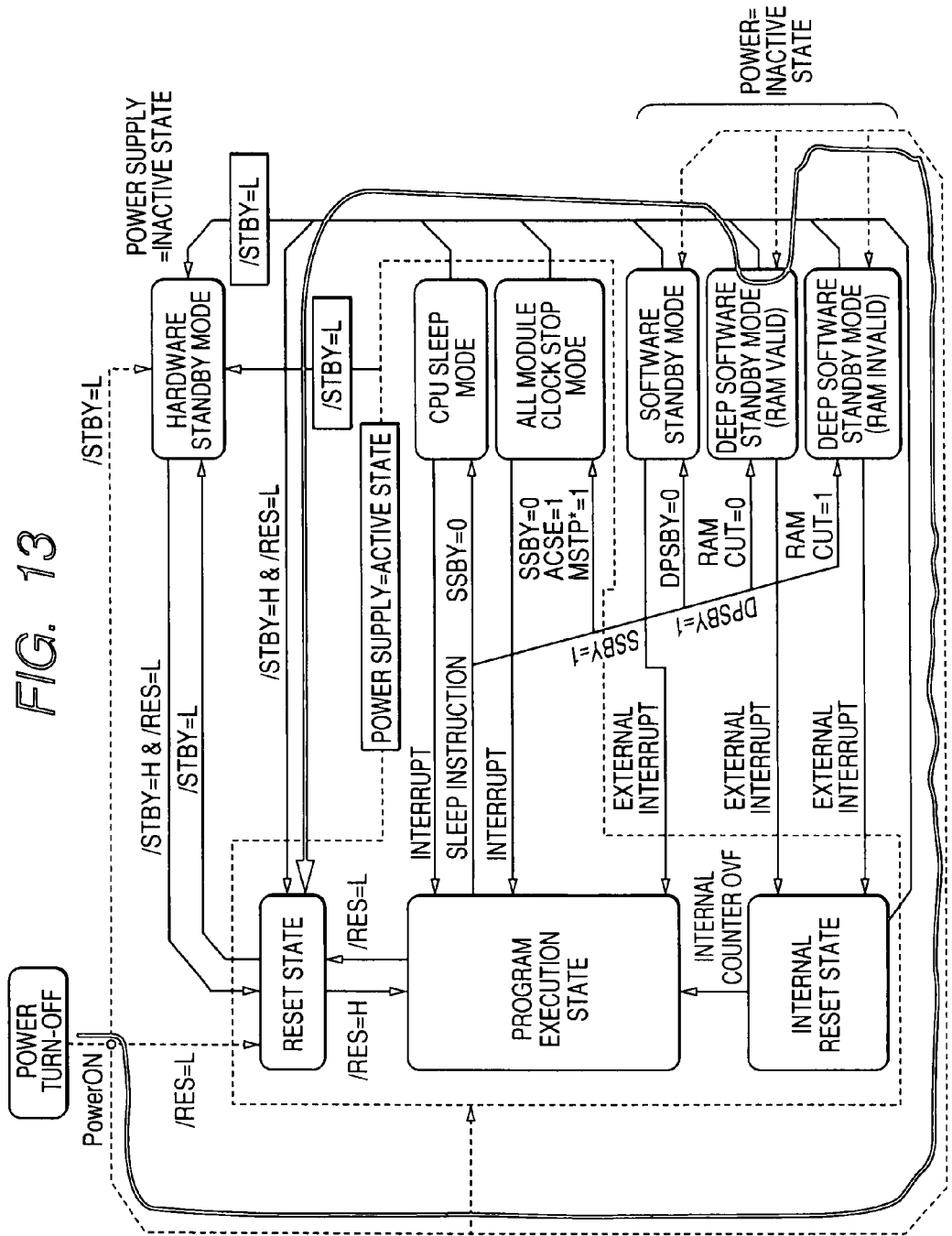
FIG. 13 is a state transition diagram of a microcomputer seen from the power supply control circuit.

FIG. 13 shows a state transition of the microcomputer 1 seen from the power supply control circuit 30. /STBY indicates a hardware standby terminal of low enable, and /RES expresses a reset terminal of low enable. When the external power supply VCC is turned on, the values of the power supply control state buffer 37 and the power supply control register buffer 38 are not unconditionally determined by a reset instruction for the reason that the values are influenced by the update enable signals 41 and 42. In the embodiment, when the hardware standby mode is not instructed at power-on, a power active state or a power inactive state is employed. Particularly, in the case of employing the power inactive state, by the time the external power supply VCC is turned on and stability is obtained, the power supply control sequence circuit 39 is constructed to reach the software standby mode, the deep software standby mode in which the RAM is made valid, or the deep software standby mode in which the RAM is made invalid. In short, the power supply sequence control circuit 39 is logically constructed so that each of a DPSBY bit and a RAMCUT bit reaches an internal state obtained by the logical value 0 or 1. For example, in FIG. 13, in the case where the power supply control sequence circuit 39 reaches the deep software standby mode in which the RAM is made valid by turn-on of the external power supply VCC, the mode shifts to the power active state by the following reset instruction, and the microcomputer 1 enters a state where a program can be executed by the CPU. As described above, the internal circuits of the power supply sequence control circuit 39 do not become unstable at turn-on of the external power supply VCC. Therefore, when a reset instruction is given from the outside, a situation that reference to the software standby holding circuit 35 required to cancel the operation power supply interruption is continuously stopped in response to the instruction does not occur. By power-on, the internal circuits of the semiconductor integrated circuit can be shifted to the normal state.

Figure 14:
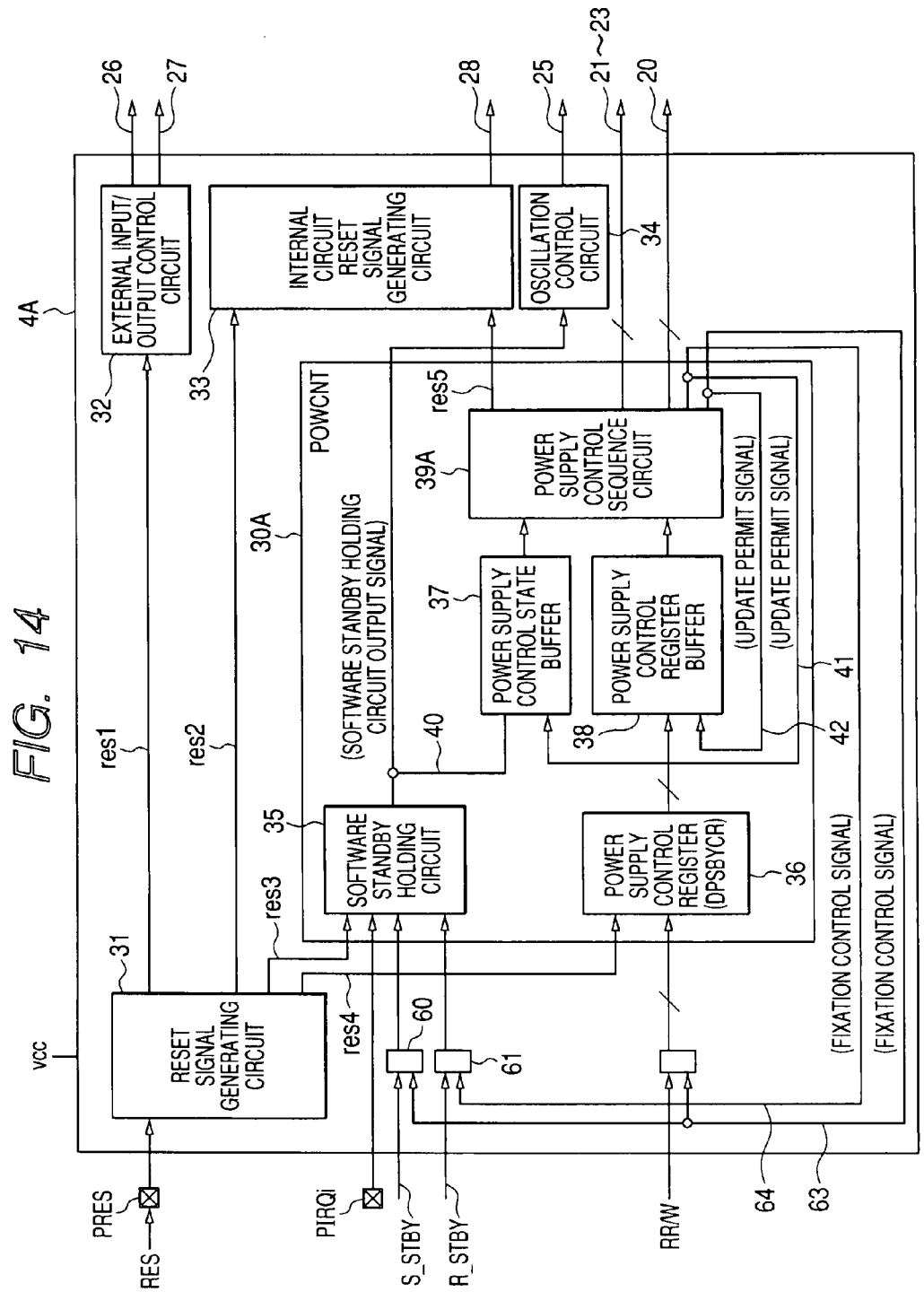
FIG. 14 is a block diagram showing another example of the power supply control circuit.

Countermeasure for Instantaneous Interruption of Operation Power and Erroneous Operation Prevention FIG. 14 shows another example of a power supply control circuit 30A. The configuration of FIG. 14 is different from that of FIG. 4 with respect to the point that the circuit 30A is also provided with a signal clamping circuit 60 for selectively clamping an input of a software standby transition signal S_STBY to a disable level, a signal clamping circuit 61 for selectively clamping an input of a software standby cancellation signal R_STBY to a disable level, and a signal clamping circuit 62 for selectively clamping an input of a register read/write signal RR/W of the power supply control register 36 to a disable level. Clamping and cancellation of inputs of the signal clamping circuits 60 and 62 are controlled by a clamp control signal 63 output from a power supply control sequence circuit 39A. Clamping and cancellation of an input of the signal clamping circuit 61 is controlled by a clamp control signal 64 output from the power supply control sequence circuit 39A. During a period since the external power supply VCC is turned on until the software standby mode, the deep software standby mode of making the RAM valid, or the deep software standby mode of making the RAM invalid is reached as described above with reference to FIG. 13, the power supply control sequence circuit 39A clamps outputs of the signal clamping circuits 60 to 62 to a predetermined level. For example, the signal clamping circuits 60 and 61 clamp the input software standby transition signal S_STBY and the software standby cancellation signal R_STBY invalid (inactive), respectively, and the signal clamping circuit 62 clamps the register read/write signal RR/W at a read instruction. It can help to avoid a situation such that the internal circuit 2 which becomes unstable due to instantaneous interruption of the operation power makes low-power-consumption-mode data unstable, or the software standby holding circuit 35 repeats a set state and a reset state so that the state of the power supply control sequence circuit 39A is not unconditionally determined. It enables the microcomputer to be stabilized in a predetermined program execution state or a power state according to the low-power-consumption mode via the power supply control sequence circuit 39A also in the case where a reset is not instructed at power-on and the internal circuit 2 becomes unstable.

In an active mode (power supply active state) in which the CPU of the second circuit 12 can access the power supply control register 36 and the software standby holding circuit 35 can be set/reset by the signal S_STBY or R_STBY, the power supply control sequence circuit 39 deactivates the output clamping function of the signal clamping circuits 60 and 62 and activates the output clamping function of the signal clamping circuit 61. On the contrary, in an inactive mode (power supply inactive state) in which the CPU cannot access the power supply control register 36 and the software standby holding circuit 35 cannot be set by the signal S_STBY, the power supply control sequence circuit 39 activates the output clamping function of the signal clamping circuits 60 and 62 and deactivates the output clamping function of the signal clamping circuit 61. It can be prevented that the low-power-consumption mode is undesirably changed by unstable operation of the internal circuit 2 after power-on. Since the other functions of the power supply control circuit 30A are the same as those described with reference to FIG. 4, their detailed description will not be repeated.

Figure 15:
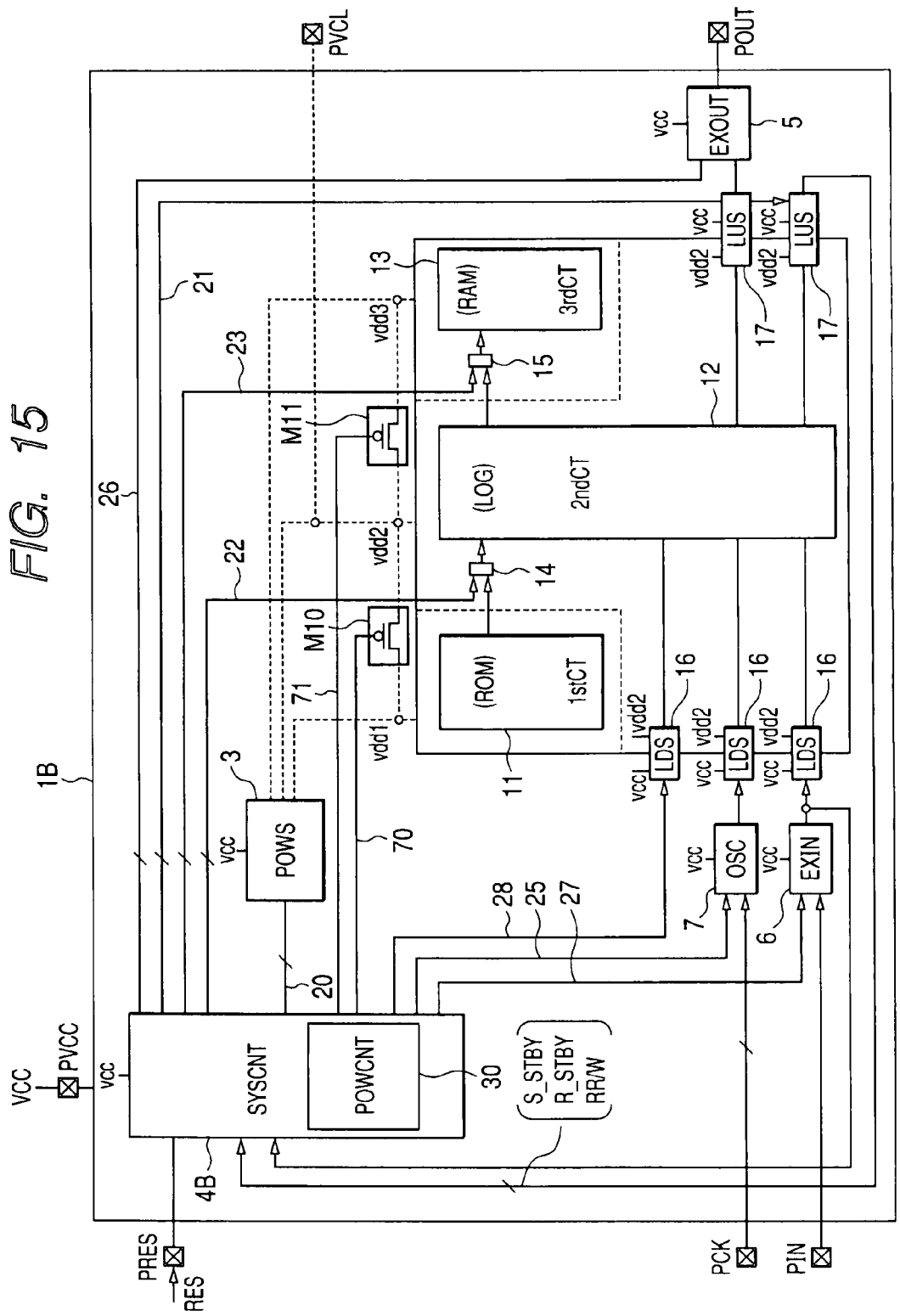
FIG. 15 is a block diagram showing another example of the microcomputer.

FIG. 15 shows another example of the microcomputer. A microcomputer 1B shown in the diagram is different from FIG. 1 with respect to the points that the microcomputer 1B is provided with a p-channel-type switch MOS transistor M10 for selectively bringing a path of supplying the internal power supply voltage vdd1 decreased by the power supply circuit 3 or a path of supplying the voltage vdd2 into conduction, and a p-channel-type switch MOS transistor M1 for selectively bringing a path of supplying the internal power supply voltage vdd3 or the path of supplying the voltage vdd2 into conduction, and switch control signals 70 and 71 are generated by a system control circuit 4B. Since the other configuration is the same as that of FIG. 1, its detailed configuration will not be described. The switches M10 and M11 are not limited to p-channel-type switch MOS transistors. In the microcomputer 1B, in the software standby mode of FIG. 3, reduction in power consumption is realized by using only the power supply function with vdd3. In this case, the switch MOS transistor M11 is turned on and the switch MOS transistor M10 is turned off. In the deep software standby mode in which the RAM in the third circuit 13 is made valid, only supply of power with vdd3 is performed and the switch MOS transistors M10 and M11 are turned off. In the control of transition to the low power consumption state and cancellation, it is sufficient to turn on/off the switch MOS transistors M10 and M11 together with the control of supply and interruption of necessary power. PVCL denotes an external terminal to which a smoothing capacitative element for smoothing power is connected.

Although the invention achieved by the inventors herein has been concretely described on the basis of the embodiments, obviously, the invention is not limited to the embodiments but can be variously modified without departing from the gist of the invention.

For example, the power region of the internal circuit may not be divided into three regions but may be divided into two regions or four or more regions. The ROM may be a mask ROM or a flash memory or the like requiring a voltage whose absolute value is higher than that of an external voltage VCC for writing/erasing information. In a flash memory or the like, the operation power supply to a charge pump circuit for generating such high voltage or a circuit using the external power supply voltage VCC as an operation power may not be interrupted. The power supply control register 36 may not be divided into a plurality of parts. The control register SBYCR may be provided in another place in the semiconductor integrated circuit.

What is claimed is:

1. A semiconductor integrated circuit having an internal circuit to which operation power is supplied or interrupted, and a power supply control circuit for controlling the supply and interruption of operation power to the internal circuit in accordance with an operation mode, wherein the power supply control circuit has a storage circuit and a power supply control sequence circuit, wherein the storage circuit inputs and holds switching instruction data for instructing switching between supply and interruption of the operation power and low-power-consumption-mode data determining an operation mode of the interruption of operation power and cancellation of the interruption, wherein the held switching instruction data and the low-power-consumption-mode data is initialized in response to a reset instruction from the outside, wherein the switching instruction data and the low-power-consumption-mode data initialized instructs supply of operation power to the internal circuit, and wherein the power supply control sequence circuit performs a control of transition between the interruption and supply of the operation power with reference to the switching instruction data and the low-power-consumption-mode data held in the storage circuit and, at the time of cancelling a state of interrupting the supply of operation power in response to the switching instruction data in the operation power supply interruption state according to the low-power-consumption-mode data, stops newly referring to the low-power-consumption mode data until an operation of the internal circuit to which the operation power is to be supplied is assured.

2. The semiconductor integrated circuit according to claim 1, wherein when the control of transition to the operation power supply interruption state is started in accordance with the switching instruction data, the power supply control sequence circuit stops newly referring to the switching instruction data until the operation power supply interruption completes.

3. The semiconductor integrated circuit according to claim 1, further comprising a switching instruction data buffer to which the switching instruction data held in the storage circuit is input and to which the power supply control sequence circuit refers, wherein the power supply control sequence circuit waits for completion of the power supply interruption and, after the completion, permits the held data to be updated in the switching instruction data buffer.

4. The semiconductor integrated circuit according to claim 3, further comprising a low-power-consumption mode data buffer to which the low-power-consumption mode data held in the storage circuit is input and to which the power supply control sequence circuit refers, wherein the power supply control sequence circuit permits the held data to be updated in the low-power-consumption mode data buffer in a period in which the operation of an internal circuit to which the operation power is supplied is assured.

5. The semiconductor integrated circuit according to claim 4, wherein the internal circuit has a central processing unit, wherein the storage circuit comprises a flip flop outputting the switching instruction data, and a low-power-consumption-mode register holding the low-power-consumption-mode data, wherein the flip flop is set when the central processing unit executes a sleep instruction, is reset in response to an interruption, is reset in response to an external reset request, instructs power supply interruption in the set state, and instructs power supply in the reset state, an output of the flip flop is supplied as switching instruction data to the switching instruction data buffer, wherein the low-power-consumption-mode register is accessed for reading/writing by the central processing unit, and wherein the low-power-consumption-mode data held in the low-power-consumption-mode register is supplied to the low-power-consumption-mode data buffer.

6. The semiconductor integrated circuit according to claim 2, wherein the internal circuit has a plurality of power supply regions in each of which operation power can be supplied or interrupted, wherein a signal propagation path from one power supply region to another power supply region is provided with an inconstant propagation preventing circuit for clamping an output to a signal propagation path extended to a power supply region on the downstream side to a predetermined logical value at the time of interruption of the operation power in a power supply region on the upstream side, and wherein the power supply control sequence circuit performs a transition control of clamping and cancellation of an output logical value by the inconstant propagation preventing circuit by referring to the switching instruction data and the low-power-consumption-mode data held in the storage circuit.

7. The semiconductor integrated circuit according to claim 6, wherein the state where operation of the internal circuit to which the operation power is supplied as a condition of stopping newly referring to the low-power-consumption-mode data is a state where cancellation of clamping an output logical value of the inconstant propagation preventing circuit completes.

8. The semiconductor integrated circuit according to claim 7, further comprising a power supply circuit for generating operation power to be supplied to the internal circuit on the basis of an external power supplied from the outside, wherein the power supply circuit has a voltage regulator for each of the power regions, the voltage regulator comprises a clamp circuit for clamping drain voltage to a voltage equal to reference voltage by performing negative feedback control on conductance of a clamp MOS transistor so that the drain voltage coincides with the reference voltage, a discharge MOS transistor for selectively conducting the drain of the clamp MOS transistor to ground potential, and a cut-off MOS transistor for selectively turning off the clamp MOS transistor, and wherein the power supply control sequence circuit generates a switching control timing of the clamp MOS transistor and the discharge MOS transistor in accordance with a plurality of signal logical operation results obtained by sequentially delaying the switching instruction data and, in response to a change that instructs operation power supply interruption of the switching instruction data, generates a switching control timing of turning off the clamp MOS transistor by the cutoff MOS transistor, turning on the discharge MOS transistor, and interrupting power.

9. The semiconductor integrated circuit according to claim 2, wherein by the time power supplied from the outside of the semiconductor integrated circuit becomes stable, the power supply control sequence circuit reaches a predetermined program execution state or a predetermined low-power-consumption mode according to predetermined low-power-consumption-mode data.

10. The semiconductor integrated circuit according to claim 9, wherein the power supply control sequence circuit deactivates an input of the low-power-consumption-mode data from the internal circuit to the storage circuit until it reaches the predetermined program execution state.

11. The semiconductor integrated circuit according to claim 10, wherein the power supply control sequence circuit deactivates an input of switching instruction data from the internal circuit and the outside of the semiconductor integrated circuit to the storage circuit until it reaches the predetermined program execution state or the low-power-consumption-power mode.

12. The semiconductor integrated circuit according to claim 2,
wherein the internal circuit has a central processing unit capable of writing low-power-consumption-mode data to the storage circuit,
wherein the power supply control sequence circuit activates input of an operation power supply interruption instruction by the switching instruction data to the storage circuit in an active mode in which the central processing unit can access the storage circuit, and
wherein the power supply control sequence circuit activates input of an operation power supply interruption canceling instruction by the switching instruction data to the storage circuit in an inactive mode in which the central processing unit cannot access the storage circuit.

13. The semiconductor integrated circuit according to claim 12, wherein the power supply control sequence circuit deactivates a write enable signal to the storage circuit in the inactive mode.

14. A semiconductor integrated circuit having an internal circuit to which operation power is supplied or interrupted, and a power supply control circuit for controlling the supply and interruption of operation power to the internal circuit in accordance with an operation mode,
wherein the power supply control circuit has a storage circuit and a power supply control sequence circuit,
wherein the storage circuit inputs and holds control data for controlling switching between supply and interruption of the operation power,
wherein the held control data is initialized in response to a reset instruction from the outside,
wherein the initialized control data instructs supply of operation power to the internal circuit, and
wherein the power supply control sequence circuit performs a control of transition between the interruption and supply of the operation power with reference to the control data held in the storage circuit, and
wherein, by the time an operation power is supplied from the outside of the semiconductor integrated circuit and becomes stable, the power supply control sequence circuit reaches a predetermined program execution state or a state in a predetermined low-power-consumption mode instructed by predetermined control data.

15. The semiconductor integrated circuit according to claim 14, wherein the power supply control sequence circuit deactivates input of the control data from the internal circuit to the storage circuit until the power supply control sequence circuit reaches the predetermined program execution state or a state in the low-power-consumption mode.

16. The semiconductor integrated circuit according to claim 15, wherein the power supply control sequence circuit deactivates input of the control data from the outside of the semiconductor integrated circuit to the storage circuit until the power supply control sequence circuit reaches the predetermined program execution state or a state in the low-power-consumption mode.

17. A semiconductor integrated circuit having an internal circuit to which operation power is supplied or interrupted, and a power supply control circuit for controlling the supply and interruption of operation power to the internal circuit in accordance with an operation mode,
wherein the power supply control circuit has a storage circuit and a power supply control sequence circuit,
wherein the storage circuit inputs and holds switching instruction data instructing switching between supply and interruption of the operation power and low-power-consumption-mode data determining an operation mode of interruption/cancellation of operation power,
wherein the switching instruction data and the low-power-consumption-mode data held, is initialized in response to a reset instruction from the outside,
wherein the switching instruction data and the low-power-consumption-mode data initialized instructs supply of operation power to the internal circuit, and
wherein the power supply control sequence circuit performs a control of transition between the interruption and supply of the operation power with reference to the switching instruction data and the low-power-consumption-mode data held in the storage circuit,
wherein the internal circuit has a central processing unit capable of writing low-power-consumption-mode data to the storage circuit,
wherein the power supply control sequence circuit activates input of an operation power supply interruption instruction by the switching instruction data to the storage circuit in an active mode in which the central processing unit can access the storage circuit, and
wherein the power supply control sequence circuit activates input of an operation power supply interruption canceling instruction by the switching instruction data to the storage circuit in an inactive mode in which the central processing unit cannot access the storage circuit.

18. The semiconductor integrated circuit according to claim 17, wherein the power supply control sequence circuit deactivates a write enable signal to the storage circuit in the inactive mode.

* * * * *